(12) United States Patent
Katayama et al.

(10) Patent No.: US 12,488,574 B2
(45) Date of Patent: Dec. 2, 2025

(54) INFORMATION PROCESSING DEVICE, DETERMINATION METHOD, AND INFORMATION PROCESSING PROGRAM

(71) Applicant: HITACHI ZOSEN CORPORATION, Osaka (JP)

(72) Inventors: Takeru Katayama, Osaka (JP); Kaoru Shinoda, Osaka (JP); Masamitsu Abe, Osaka (JP); Ryota Ioka, Osaka (JP); Takahiro Wada, Osaka (JP); Joichi Murakami, Osaka (JP); Hiroshi Hattori, Osaka (JP)

(73) Assignee: Kanadevia Corporation, Osaka (JP)

( * ) Notice: Subject to any disclaimer, the term of this patent is extended or adjusted under 35 U.S.C. 154(b) by 386 days.

(21) Appl. No.: 18/008,872

(22) PCT Filed: May 14, 2021

(86) PCT No.: PCT/JP2021/018459
§ 371 (c)(1),
(2) Date: Dec. 7, 2022

(87) PCT Pub. No.: WO2021/251064
PCT Pub. Date: Dec. 16, 2021

(65) Prior Publication Data
US 2023/0298327 A1    Sep. 21, 2023

(30) Foreign Application Priority Data
Jun. 10, 2020   (JP) ................................ 2020-101125

(51) Int. Cl.
*G06V 10/776* (2022.01)
*G01B 17/02* (2006.01)
(Continued)

(52) U.S. Cl.
CPC .......... *G06V 10/776* (2022.01); *G01B 17/02* (2013.01); *G01N 29/0654* (2013.01);
(Continued)

(58) Field of Classification Search
CPC .. G06V 10/776; G06V 10/764; G06V 10/774; G01B 17/02; G01N 29/0654;
(Continued)

(56) References Cited

U.S. PATENT DOCUMENTS

| 6,756,589 B1 | 6/2004 | Obara et al. |
| 2003/0234239 A1 | 12/2003 | Lee et al. |

(Continued)

FOREIGN PATENT DOCUMENTS

| CN | 104937408 A | 9/2015 |
| CN | 107024541 A | 8/2017 |

(Continued)

OTHER PUBLICATIONS

U.S. Appl. No. 18/008,632, filed Dec. 6, 2022, Pending.
(Continued)

*Primary Examiner* — Jennifer Mehmood
*Assistant Examiner* — Vaisali Rao Koppolu
(74) *Attorney, Agent, or Firm* — Pillsbury Winthrop Shaw Pittman, LLP

(57) ABSTRACT

A final determination result is derived in accordance with target data, in consideration of determination results given by determining sections. An information processing device includes: a reliability determining section that determines, in accordance with an inspection image, reliabilities of determination results given by determining sections each configured to determine a given determination matter in accordance with the inspection image; and a comprehensive
(Continued)

determination section configured to determine the given determination matter with use of the determination results and the reliabilities.

6 Claims, 14 Drawing Sheets

(51) Int. Cl.
  *G01N 29/06* (2006.01)
  *G06T 7/00* (2017.01)
  *G06V 10/764* (2022.01)
  *G06V 10/774* (2022.01)

(52) U.S. Cl.
  CPC .......... *G06T 7/0008* (2013.01); *G06V 10/764* (2022.01); *G06V 10/774* (2022.01); *G01N 2291/02854* (2013.01); *G01N 2291/0289* (2013.01); *G01N 2291/267* (2013.01); *G06T 2207/10132* (2013.01); *G06T 2207/30148* (2013.01)

(58) Field of Classification Search
  CPC . G01N 2291/02854; G01N 2291/0289; G01N 2291/267; G01N 29/069; G01N 29/11; G01N 29/4418; G01N 29/4445; G01N 29/4481; G01N 29/225; G01N 2291/0258; G01N 2291/2636; G06T 7/0008; G06T 2207/10132; G06T 2207/30148; G06T 2207/20084; G06T 2207/30164; G06T 7/0004
  See application file for complete search history.

(56) References Cited

U.S. PATENT DOCUMENTS

| | | | |
|---|---|---|---|
| 2006/0219013 | A1 | 10/2006 | Baba et al. |
| 2009/0255473 | A1 | 10/2009 | Katz et al. |
| 2014/0202937 | A1 | 7/2014 | Ohtake et al. |
| 2016/0070987 | A1 | 3/2016 | Irie et al. |
| 2018/0070798 | A1* | 3/2018 | Kamiyama ............... G06T 7/75 |
| 2018/0101944 | A1 | 4/2018 | Sakai et al. |
| 2018/0211373 | A1 | 7/2018 | Stoppa et al. |
| 2019/0050978 | A9 | 2/2019 | Sakai et al. |
| 2019/0072526 | A1* | 3/2019 | Kitazawa ............. G01N 29/262 |
| 2019/0188845 | A1 | 6/2019 | Tamai |
| 2019/0197680 | A1 | 6/2019 | Sakai et al. |
| 2019/0290246 | A1 | 9/2019 | Huang et al. |
| 2019/0323993 | A1 | 10/2019 | Mendes Rodrigues et al. |
| 2019/0325606 | A1* | 10/2019 | Oota ........................ G06T 7/74 |
| 2020/0058115 | A1 | 2/2020 | Mimura et al. |
| 2020/0065954 | A1 | 2/2020 | Komatsu et al. |
| 2020/0175675 | A1 | 6/2020 | Ogino et al. |
| 2020/0226744 | A1 | 7/2020 | Cohen et al. |
| 2020/0364906 | A1 | 11/2020 | Shomodaira |
| 2021/0012476 | A1 | 1/2021 | Miyazawa et al. |
| 2021/0295485 | A1 | 9/2021 | Miyazawa |
| 2021/0397176 | A1* | 12/2021 | Min ....................... G06Q 10/04 |
| 2022/0335291 | A1 | 10/2022 | Sawada et al. |

FOREIGN PATENT DOCUMENTS

| | | | |
|---|---|---|---|
| CN | 110036279 | A | 7/2019 |
| CN | 110388879 | A | 10/2019 |
| CN | 110849909 | A | 2/2020 |
| JP | 3-280170 | A | 12/1991 |
| JP | 08-110326 | A | 4/1996 |
| JP | 2000-30652 | A | 1/2000 |
| JP | 2003-232779 | A | 8/2003 |
| JP | 2007-048006 | A | 2/2007 |
| JP | 2009-128325 | A | 6/2009 |
| JP | 2009-236550 | A | 10/2009 |
| JP | 2010-243375 | A | 10/2010 |
| JP | 2011-516879 | A | 5/2011 |
| JP | 2011-163918 | A | 8/2011 |
| JP | 2014-048169 | A | 3/2014 |
| JP | 2014-163805 | A | 9/2014 |
| JP | 2015-130093 | A | 7/2015 |
| JP | 2016-040650 | A | 3/2016 |
| JP | 2016057701 | A | 4/2016 |
| JP | 2017-078935 | A | 4/2017 |
| JP | 2017-129444 | A | 7/2017 |
| JP | 2018-054354 | A | 4/2018 |
| JP | 2019-025044 | A | 2/2019 |
| JP | 6474946 | B | 2/2019 |
| JP | 6494369 | B | 4/2019 |
| JP | 2019-106090 | A | 6/2019 |
| JP | 2019-133306 | A | 8/2019 |
| JP | 2019-197007 | A | 11/2019 |
| JP | 2020-503509 | A | 1/2020 |
| JP | 2020-028679 | A | 2/2020 |
| JP | 2020-058800 | A | 4/2020 |
| JP | 2020-187657 | A | 11/2020 |
| TW | 201942567 | A | 11/2019 |
| WO | 2016/185617 | A1 | 11/2016 |
| WO | 2019/103772 | A1 | 5/2019 |
| WO | 2020/031984 | A1 | 2/2020 |
| WO | 2021/053815 | A1 | 3/2021 |

OTHER PUBLICATIONS

U.S. Appl. No. 18/552,965, filed Sep. 28, 2023, Pending.
Alex Krizhevsky et al., "ImageNet Classification with Deep Convolutional Neural Networks", Advances in Neural Information Processing Systems, Jan. 2012, 25(2), pp. 1-9.
Chong Zhou et al., "Anomaly Detection with Robust Deep Autoencoders", KDD 2017 Research Paper, Aug. 13-17, 2017, Halifax, NS, Canada, pp. 665-674.
International Search Report dated Jul. 27, 2021, issued in corresponding International Application No. PCT/JP2021/018459, with English translation (6 pgs.).
Written Opinion of the International Searching Authority dated Jul. 27, 2021, issued in corresponding International Application No. PCT/JP2021/018459 (6 pgs.).
G.E. Hinton et al., "Reducing the Dimensionality of Data with Neural Networks", Science, vol. 313, Jul. 28, 2006, pp. 504-507.
Joseph Redmon et al., "YOLO9000: Better, Faster, Stronger", University of Washington, Allen Institute for AI, pp. 1-9 http://pjreddie.com/yolo9000/.
Joseph Redmon et al., "You Only Look Once: Unified, Real-Time Object Detection", University of Washington, Allen Institute for AI, Facebook AI Research, pp. 779-788 http://pjreddie.com/yolo/.
Kaoru Shinoda et al., "Application of Phased Array Ultrasonic Testing for Tube-to-Tubesheet Weld of Heat Exchanger Using Deep Learning", IIW 2022 International Conference on Welding and Joining pp. 180-183.
International Search Report dated Apr. 5, 2022, issued in corresponding International Application No. PCT/JP2022/001699 with English translation (4 pgs.).
International Preliminary Report on Patentability and Written Opinion of the International Searching Authority dated Apr. 5, 2022, issued in corresponding International Application No. PCT/JP2022/001699 with English translation (7 pgs.).
International Search Report dated Jun. 29, 2021, issued in corresponding International Application No. PCT/JP2021/014383 with English translation (9 pgs.).
Written Opinion of the International Searching Authority dated Jun. 29, 2021, issued in corresponding International Application No. PCT/JP2021/014383 (8 pgs.).
Hiromitsu Fujii, "A Short Survey on Defect Detection for Inspection of Social Infrastructures", Technical report of IEICE (Institute of Electronics, Information and Communication Engineers), Japan, vol. 116, No. 208, pp. 163-166, with English translation (19 pgs.).
Office Action dated Apr. 9, 2024, issued in corresponding Japanese Patent Application No. 2020-101125 with English translation (6 pgs.).

(56) References Cited

OTHER PUBLICATIONS

Notification of the First Office Action dated Jan. 21, 2025, issued in corresponding Chinese Patent Application No. 202180041936.7 with English translation (14 pgs.).
Non-final Office Action dated Feb. 12, 2025, issued in corresponding U.S. Appl. No. 18/008,632 (67 pgs.).
First Office Action dated Mar. 28, 2025, issued in corresponding Chinese Patent Application No. 202180041906.6 with English translation (18 pgs.).
Notice of Reasons for Refusal dated Mar. 25, 2025, issued in corresponding Japanese Patent Application No. 2021-063688 with English translation (5 pgs.).
Examination Report dated Jun. 6, 2025, issued in corresponding India Application No. 202247073104 (8 pgs.).
First Office Action dated Jun. 23, 2025, issued in corresponding Chinese Patent Application No. 202280026355.0 with English translation (15 pgs.).

* cited by examiner

FIG. 9
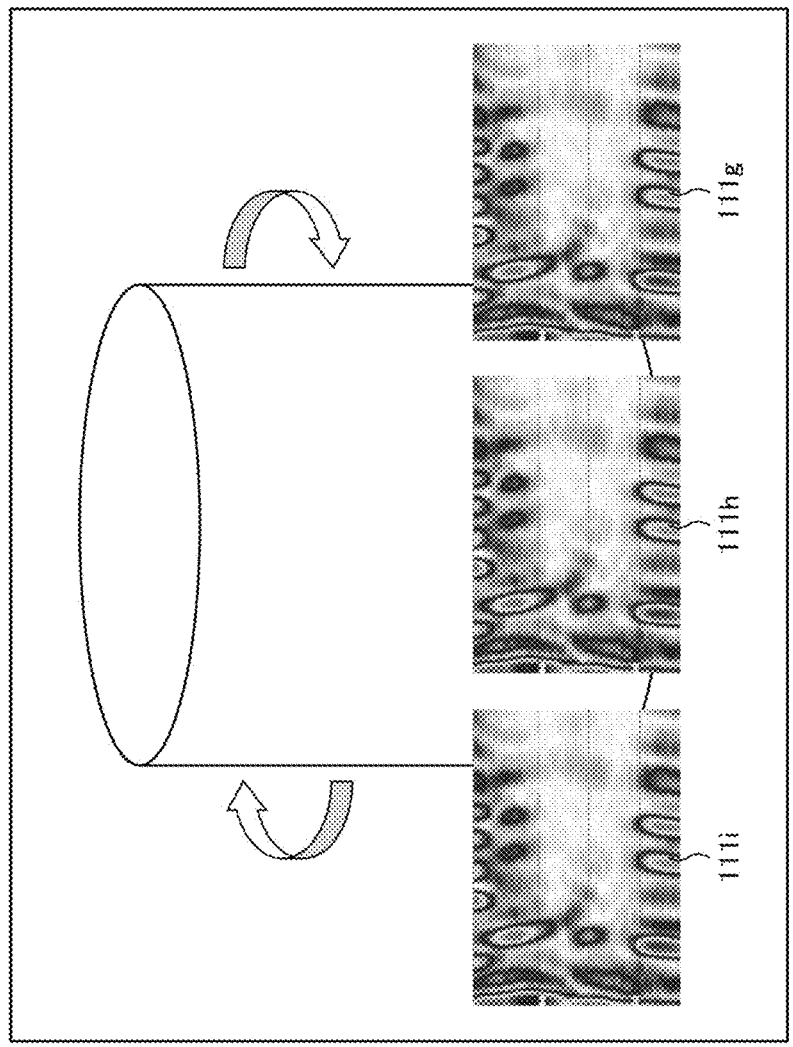
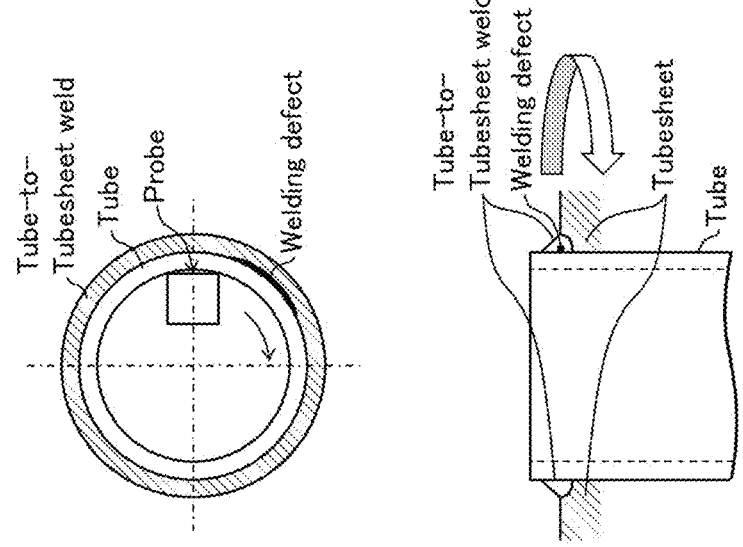

FIG. 10
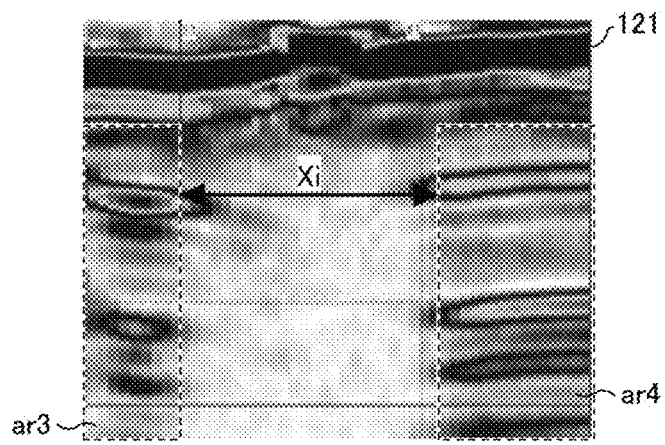
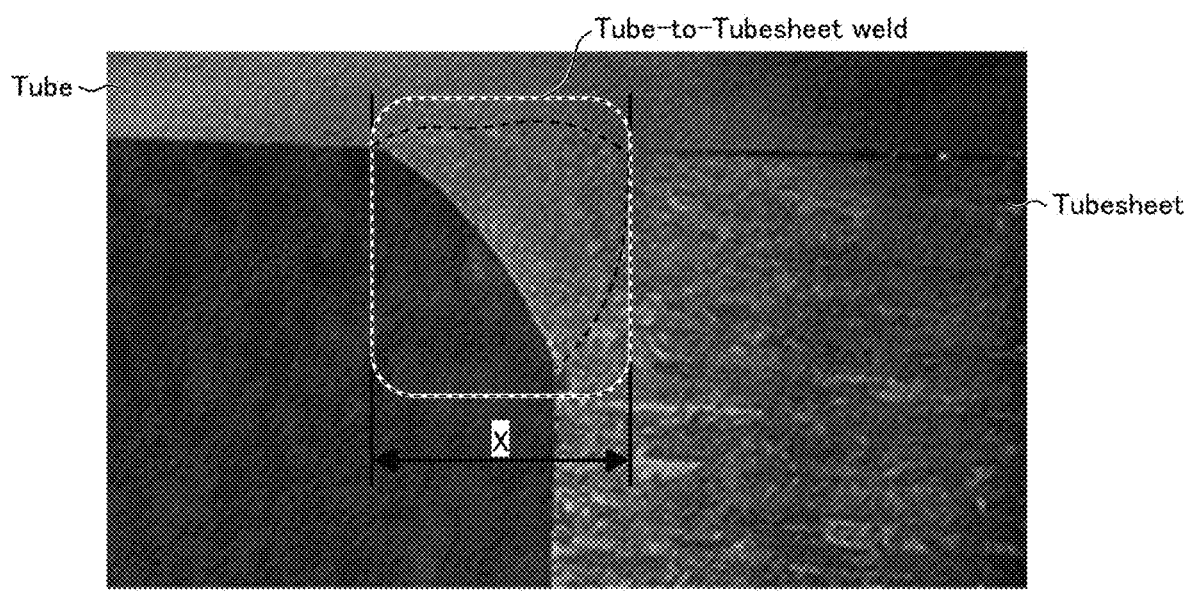

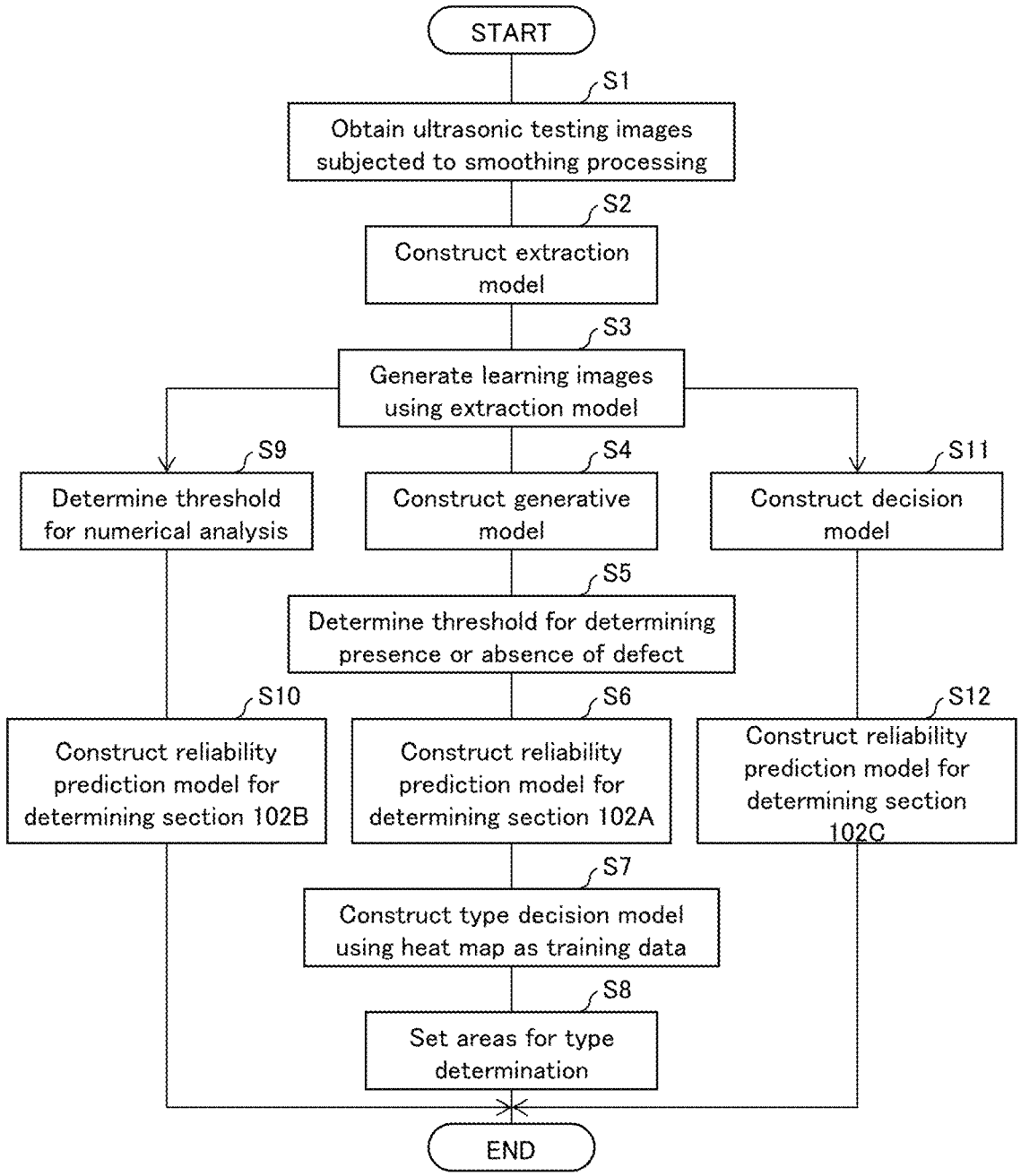

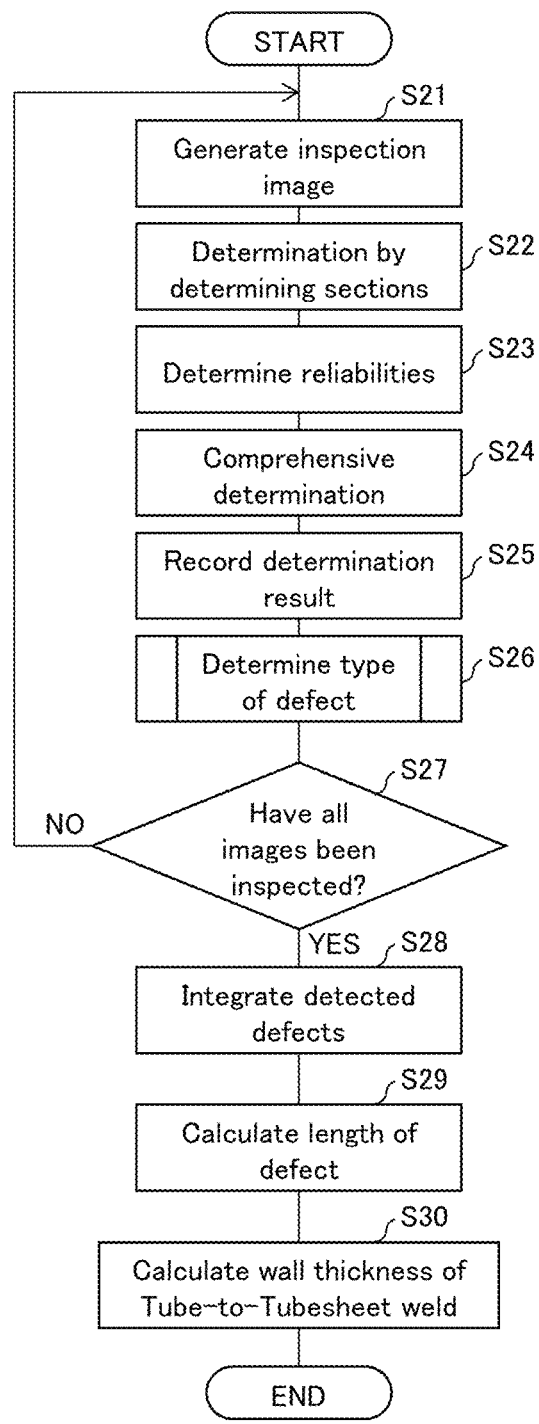

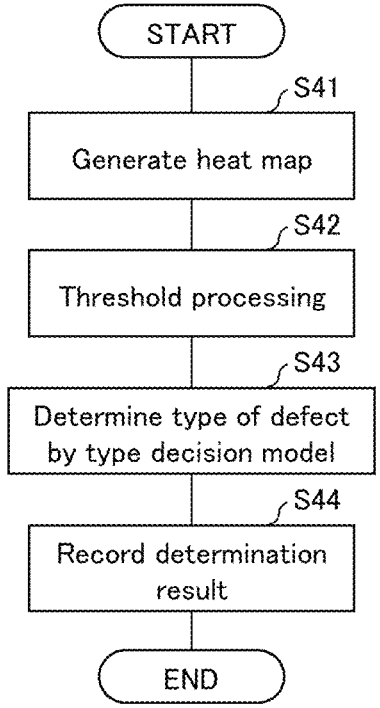
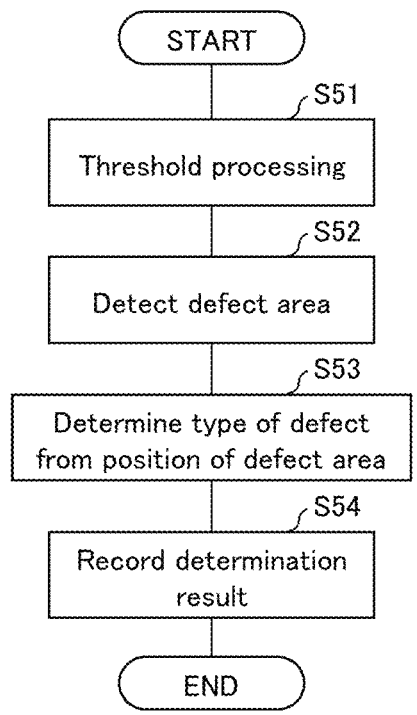

INFORMATION PROCESSING DEVICE, DETERMINATION METHOD, AND INFORMATION PROCESSING PROGRAM

CROSS-REFERENCE TO RELATED APPLICATIONS

This application is the U.S. National Stage of PCT/JP2021/018459, filed May 14, 2021, which claims priority to Japanese Patent Application No. 2020-101125, filed Jun. 10, 2020, the entire contents of both of which are herein incorporated by reference in their entireties.

TECHNICAL FIELD

The present invention relates to an information processing device and the like that determine a given determination matter (matter to be determined) in accordance with target data.

BACKGROUND ART

Patent Literature 1 indicated below discloses a technique that determines presence or absence of a defect and the type of the defect in accordance with an image of a semiconductor substrate. Specifically, the technique disclosed in Patent Literature 1 decides a final classification result in accordance with a total sum obtained by summing up values obtained by multiplying (i) respective classification results of classifiers by (ii) weights respectively determined in advance for the classifiers. With this, it is possible to expect improvement in classification accuracy as compared to that of a case in which only one classifier is used.

CITATION LIST

Patent Literature

Patent Literature 1
Japanese Patent Application Publication, Tokukai, No. 2016-40650

SUMMARY OF INVENTION

Technical Problem

However, in a case where a defect is determined and classified in accordance with a plurality of images, the accuracy of classification by each classifier can vary depending on the image, since the images differ from each other in various points. Therefore, the weights determined in advance may not always be optimum. Using the weights that are not optimum can affect the accuracy in final determination.

For example, the following case may occur. That is, when two classifiers A and B are used, classification made by the classifier A is correct for a certain image but classification made by the classifier B is incorrect for the certain image, or vice versa for another image. In this case, if the weight on the classifier A is set to be greater than that of the classification B, a final classification result on the certain image is correct, but a final classification result on the another image is incorrect.

Such a problem is not limited to classification involving use of a plurality of classifiers, but is a common problem that can occur when a final determination result is derived in accordance with determination results given by a plurality of determining sections with regard to a given determination matter. Further, such a problem is not limited to determination involving use of an image, but is a common problem that can occur when determination is made in accordance with arbitrary target data.

An aspect of the present invention was made in view of the above-described problem, and has an object to realize an information processing device and the like capable of deriving a final determination result in appropriate consideration of determination results of determining sections in accordance with target data.

Solution to Problem

In order to attain the above object, an information processing device in accordance with an aspect of the present invention includes: a reliability determining section configured to carry out, for each of determining sections configured to determine a given determination matter in accordance with single target data, a process of determining a reliability, which is an indicator indicating a degree of certainty of a determination result given by the determining section, in accordance with the target data; and a comprehensive determination section configured to determine the given determination matter with use of the determination results and the reliabilities determined by the reliability determining section.

In order to attain the above object, a determination method in accordance with an aspect of the present invention is a determination method that is to be executed by one or more information processing devices, including the steps of: (i) carrying out, for each of determining sections each configured to determine a given determination matter in accordance with single target data, a process of determining a reliability, which is an indicator indicating a degree of certainty of a determination result given by the determining section, in accordance with the target data; and (ii) determining the given determination matter with use of the determination results and the reliabilities determined in the step (i).

Advantageous Effects of Invention

In accordance with an aspect of the present invention, it is possible to derive a final determination result in appropriate consideration of determination results given by determining sections in accordance with target data.

BRIEF DESCRIPTION OF DRAWINGS

FIG. 9 is a view illustrating a method for integrating defects captured in a plurality of ultrasonic testing images to detect the defects as a single defect.

FIG. 10 is a view illustrating a method for calculating a thickness of a tube-to-tubesheet weld.

FIG. 12 is a view illustrating an example of a process of constructing various models used in an inspection and determining a threshold.

FIG. 13 is a view illustrating an example of an inspection method involving use of the information processing device.

FIG. 14 is a flowchart illustrating an example of a defect type determining process that determines the type of a defect with use of a type decision model.

FIG. 15 is a flowchart illustrating an example of a defect type determining process that determines the type of a defect in accordance with the position of a defect area.

DESCRIPTION OF EMBODIMENTS

Outline of System

Figure 2:
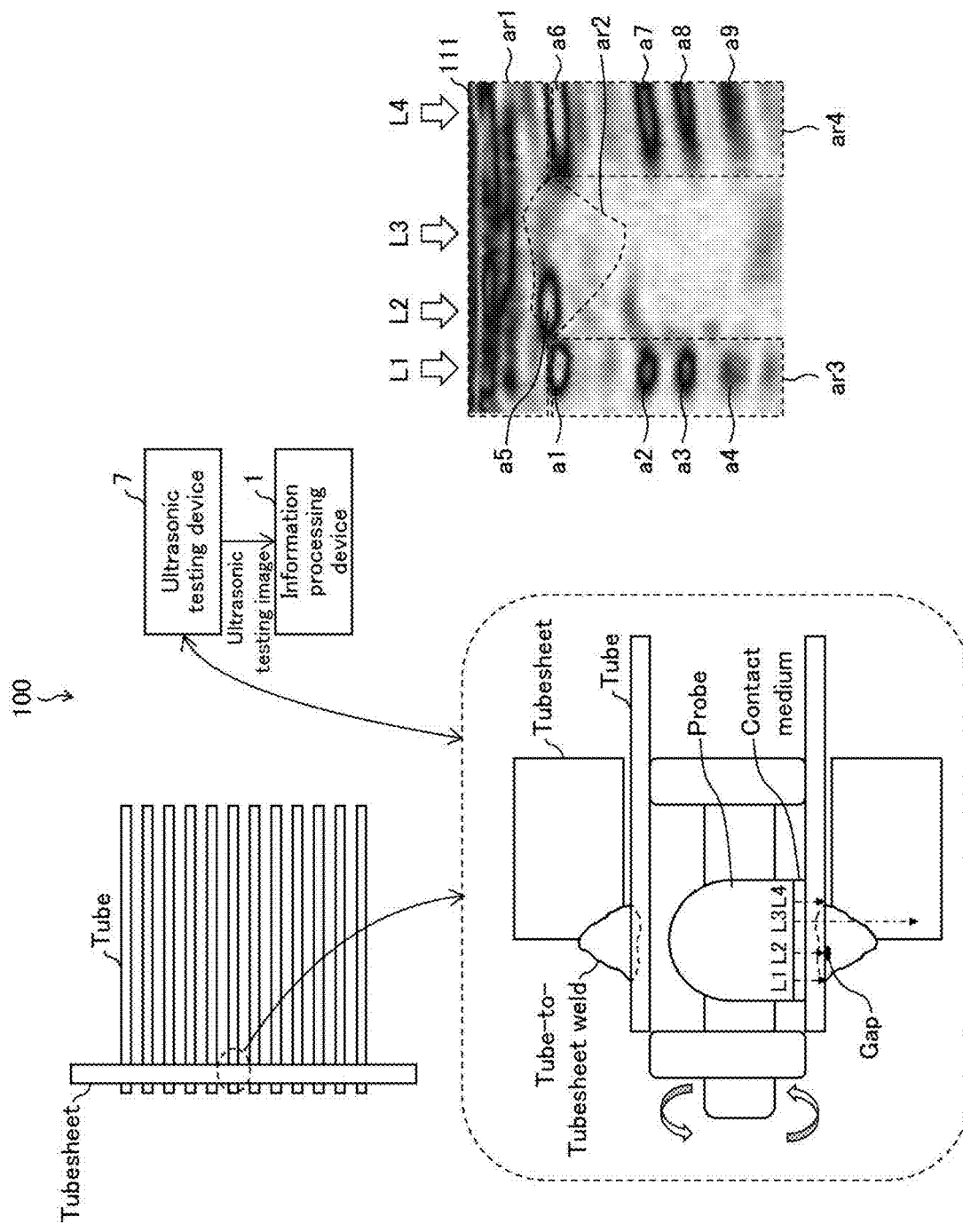
FIG. 2 is a view illustrating an outline of an inspection system including the information processing device.

The following description will discuss, with reference to FIG. 2, an outline of an inspection system in accordance with an embodiment of the present invention. FIG. 2 is a view illustrating an outline of an inspection system 100. The inspection system 100 is a system that carries out an inspection to determine, in accordance with an image of an inspection target, presence or absence of a defect in the inspection target. The inspection system 100 includes an information processing device 1 and an ultrasonic testing device 7.

The description in the present embodiment will discuss an example in which the inspection system 100 carries out an inspection to determine presence or absence of a defect in a tube-to-tubesheet weld of a heat exchanger. Note that the tube-to-tubesheet weld refers to a part in which a plurality of metal tubes constituting the heat exchanger are welded to a metal tubesheet that bundles the tubes. The defect in the tube-to-tubesheet weld refers to a gap created inside the tube-to-tubesheet weld. Note that each of the tubes and the tubesheet may be made of a nonferrous metal such as aluminum or a resin. With the inspection system 100, it is also possible to carry out an inspection to determine presence or absence of a defect in a welded part (base welded part) between a tube support and a tube in boiler equipment used in a garbage incineration plant, for example. Needless to say, the part to be inspected is not limited to the welded part, and the inspection target is not limited to the heat exchanger.

An inspection is carried in the following manner. As shown in FIG. 2, a probe having a contact medium applied thereto is inserted through a tube end. Then, the probe emits an ultrasonic wave so that the ultrasonic wave is propagated from an inner wall surface side of the tube toward the tube-to-tubesheet weld, and measures an echo of the ultrasonic wave. If such a defect as a gap in the tube-to-tubesheet weld occurs, an echo from the gap can be measured. In accordance with the echo, it is possible to detect the defect.

For example, the lower left part of FIG. 2 shows an enlarged view of an area around the probe. In the enlarged view, an ultrasonic wave indicated by the arrow L3 is propagated in a portion of the tube-to-tubesheet weld which portion has no gap. Thus, an echo of the ultrasonic wave indicated by the arrow L3 would not be measured. Meanwhile, an ultrasonic wave indicated by the arrow L2 is propagated toward a portion of the tube-to-tubesheet weld which portion has a gap. Thus, an echo of the ultrasonic wave reflected by the gap is measured.

Further, an ultrasonic wave is reflected also by the periphery of the tube-to-tubesheet weld, and therefore an echo of the ultrasonic wave propagated in the periphery is also measured. For example, since an ultrasonic wave indicated by the arrow L1 is propagated in a part closer to the tube end than the tube-to-tubesheet weld is, the ultrasonic wave does not hit the tube-to-tubesheet weld but is reflected by a tube surface of the part closer to the tube end than the tube-to-tubesheet weld is. Thus, due to the ultrasonic wave indicated by the arrow L1, an echo coming from the tube surface is measured. Meanwhile, an ultrasonic wave indicated by the arrow L4 is reflected by a tube surface of a part of the tube-to-tubesheet weld which part is closer to the far side of the tube. Thus, an echo of that ultrasonic wave is measured.

The tube-to-tubesheet weld surrounds the tube by 360 degrees. Thus, measurement is carried out repeatedly by circumferentially moving the probe by a certain angle (e.g., 1 degree). Then, data indicating the measurement result obtained with the probe is transmitted to the ultrasonic testing device 7. For example, the probe may be an array probe constituted by a plurality of array elements. In a case where the array probe is employed, the array probe may be disposed so that a direction of arrangement of the array elements coincides with a direction in which the tube extends. With this, it is possible to effectively inspect the tube-to-tubesheet weld whose width extends in the extending direction of the tube. Alternatively, the array probe may be a matrix array probe constituted by array elements arranged in rows and columns.

With use of the data indicated by the result of the measurement carried out by the probe, the ultrasonic testing device 7 generates an ultrasonic testing image that is an image of the echoes of the ultrasonic waves propagated in the tube and the tube-to-tubesheet weld. FIG. 2 illustrates an ultrasonic testing image 111, which is an example of the ultrasonic testing image generated by the ultrasonic testing device 7. Alternatively, the information processing device 1 may be configured to generate the ultrasonic testing image 111. In this case, the ultrasonic testing device 7 transmits, to the information processing device 1, the data indicating the measurement result obtained by the probe.

In the ultrasonic testing image 111, an intensity of a measured echo is presented as a pixel value of each pixel. An image area of the ultrasonic testing image 111 can be divided into a tube area ar1 corresponding to the tube, a welded area art corresponding to the tube-to-tubesheet weld, and peripheral echo areas ar3 and ar4 where echoes from peripheral parts of the tube-to-tubesheet weld appear.

As discussed above, the ultrasonic wave propagated from the probe in a direction indicated by the arrow L1 is reflected by the tube surface of the part closer to the tube end than the tube-to-tubesheet weld is. This ultrasonic wave is also reflected by the inner surface of the tube. These reflections occur repeatedly. Thus, repetition of echoes a1 to a4 appears in the peripheral echo area ar3, which extends along the arrow L1 in the ultrasonic testing image 111. The ultrasonic wave propagated from the probe in a direction indicated by the arrow L4 is repeatedly reflected by the outer surface and the inner surface of the tube. Thus, repetition of echoes a6 to a9 appears in the peripheral echo area ar4, which extends along the arrow L4 in the ultrasonic testing image 111. Each of these echoes, which appear in the peripheral echo areas ar3 and ar4, is also called "bottom echo".

The ultrasonic wave propagated from the probe in a direction indicated by the arrow L3 is not reflected by anything. Thus, no echo appears in an area extending along the arrow L3 in the ultrasonic testing image 111. Meanwhile, the ultrasonic wave propagated from the probe in a direction indicated by the arrow L2 is reflected by the gap, i.e., the defect portion in the tube-to-tubesheet weld. Thus, an echo a5 appears in an area extending along the arrow L2 in the ultrasonic testing image 111.

The information processing device 1 analyzes such an ultrasonic testing image 111 to inspect whether or not the tube-to-tubesheet weld has a defect (details thereof will be described later). If the information processing device 1 determines that the tube-to-tubesheet weld has a defect, the information processing device 1 automatically determines the type of the defect, too.

Configuration of Information Processing Device

Figure 1:
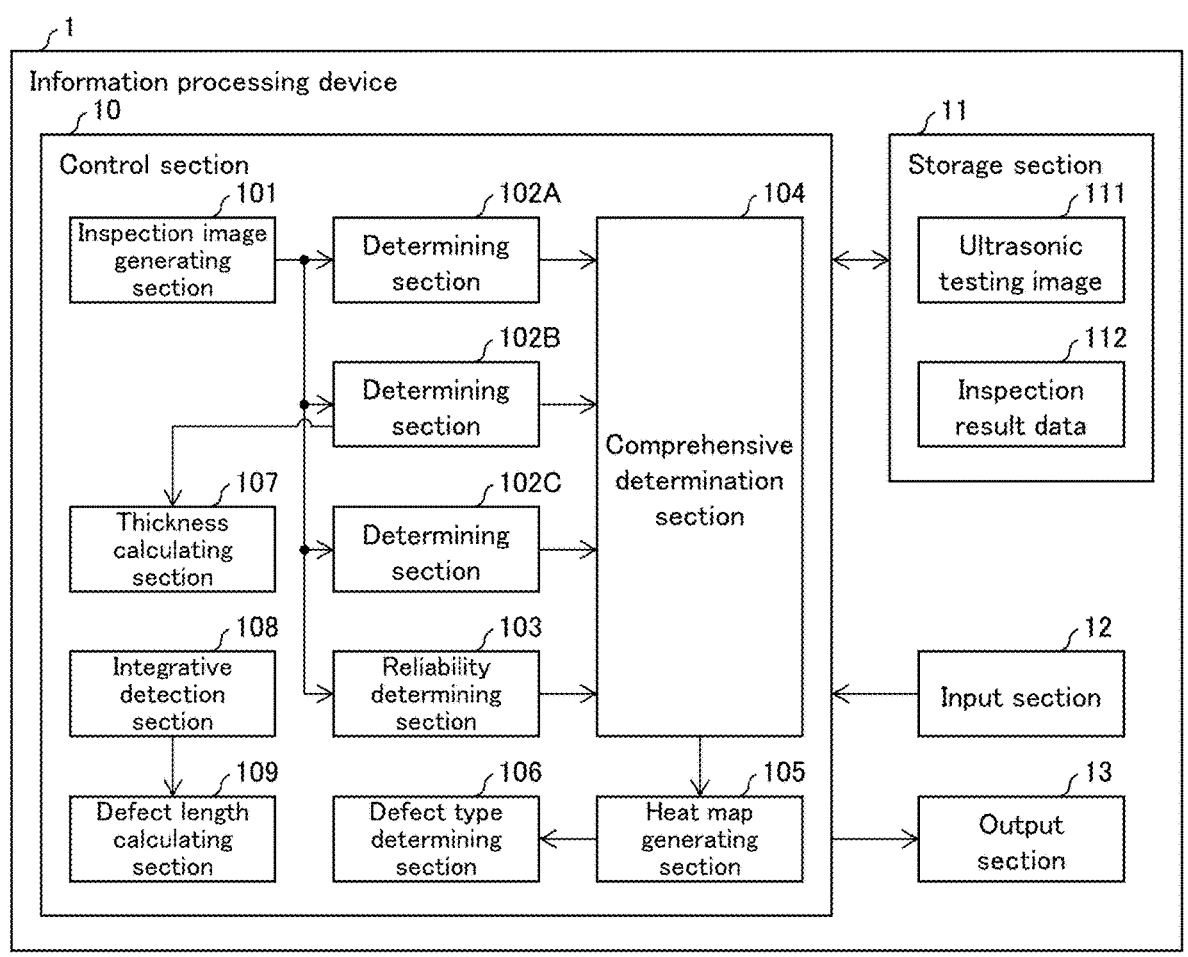
FIG. 1 is a block diagram illustrating an example of a configuration of a main part of an information processing device in accordance with Embodiment 1 of the present invention.

The following description will discuss a configuration of the information processing device 1 with reference to FIG. 1. FIG. 1 is a block diagram illustrating an example of a configuration of a main part of the information processing device 1. As shown in FIG. 1, the information processing device 1 includes a control section 10 which comprehensively controls the sections of the information processing device 1 and a storage section 11 in which various data used by the information processing device 1 is stored. The information processing device 1 further includes an input section 12 which accepts an input manipulation on the information processing device 1 and an output section 13 through which the information processing device 1 outputs data.

The control section 10 includes an inspection image generating section 101, a determining section 102A, a determining section 102B, a determining section 102C, a reliability determining section 103, a comprehensive determination section 104, a heat map generating section 105, a defect type determining section 106, a thickness calculating section 107, an integrative detection section 108, and a defect length calculating section 109. The storage section 11 has the ultrasonic testing image 111 and inspection result data 112 stored therein. In the description below, each of the determining sections 102A, 102B, and 102C will be referred to simply as a determining section 102, in a case where there is no need to distinguish the determining sections 102A, 102B, and 102B from each other.

The inspection image generating section 101 cuts an inspection target area from the ultrasonic testing image 111, so as to generate an inspection image used to determine presence or absence of a defect in the inspection target. A method for generating the inspection image will be described in detail later.

The determining section 102 determines a given determination matter in accordance with target data. In the example described in the present embodiment, the target data is an inspection image generated by the inspection image generating section 101, and the given determination matter is presence or absence of a welding defect in a tube-to-tubesheet weld in a heat exchanger captured in the inspection image. In the description below, the welding defect may simply be abbreviated as "defect".

Note that the "defect" that is a determination target may be defined in advance in accordance with the purpose and/or the like of the inspection. For example, in a case of a quality inspection of a tube-to-tubesheet weld in a manufactured heat exchanger, it may be determined that a "defect" is present when the inspection image includes an echo caused by a gap inside the tube-to-tubesheet weld or a non-allowable recess on a surface of the tube-to-tubesheet weld. Such a recess is caused by burn-through, for example. The "presence or absence of a defect" can be reworded as presence or absence of a portion (abnormal portion) different from that in a normal product. In the field of nondestructive inspection, an abnormal portion detected with use of an ultrasonic waveform or an ultrasonic testing image is generally called "flaw". The "flaw" is also encompassed in the "defect". In addition, the "defect" further encompasses chipping and cracking.

Each of the determining sections 102A, 102B, and 102C determines presence or absence of a defect in accordance with an inspection image generated by the inspection image generating section 101. However, the determining methods of the determining sections 102A, 102B, and 102C differ from each other, as will be described later.

The determining section 102A (generative model determining section) determines presence or absence of a defect with use of a generated image generated by inputting the inspection image into a generative model. The determining section 102B (numerical analysis/determination section) analyzes pixel values in the inspection image to identify an inspection target portion in the inspection image, and determines presence or absence of a defect in accordance with pixel values in the inspection target portion thus identified. The determining section 102C determines presence or absence of a defect in accordance with an output value obtained by inputting the inspection image into a decision model. Details of determinations carried out by the determining sections 102A to 102C and various models to be used will be described later.

For each of the determination results given by the determining sections 102A to 102C, the reliability determining section 103 determines a reliability, which is an indicator indicating a degree of certainty of the determination result. The reliabilities are determined in accordance with the inspection image used by the determining sections 102A to 102C to derive the determination results (details thereof will be described later).

The comprehensive determination section 104 determines presence or absence of a defect with use of (i) the determination results given by the determining sections 102A to 102C and (ii) the reliabilities determined by the reliability determining section 103. With this, it is possible to obtain a determination result in appropriate consideration of the determination results given by the determining sections 102A to 102C with a reliability corresponding to the inspection image. Details of the determination method carried out by the comprehensive determination section 104 will be described later.

The heat map generating section 105 generates a heat map with use of data obtained in the determining process of the determining section 102A. The heat map is used by the defect type determining section 106 to determine the type of the defect. The heat map will be described in detail later.

For an inspection image determined as including a defect by the comprehensive determination section 104, the defect type determining section 106 determines the type of the defect included in the inspection image. As discussed above, the determination of the type is carried out with use of the heat map generated by the heat map generating section 105. A method for determining the type of the defect will be described later.

The thickness calculating section 107 calculates a wall thickness of the tube-to-tubesheet weld. The wall thickness calculated by the thickness calculating section 107 can be used as an indicator used to determine whether or not welding has been carried out appropriately. A method for calculating the wall thickness will be described later.

If the comprehensive determination section 104 determines that a defect is present in ultrasonic testing images 111 corresponding to parts of the inspection target which parts are adjacent to each other, the integrative detection section 108 detects, as a single defect, the defects captured in the ultrasonic testing images 111. The integration of the defect will be described in detail later.

The defect length calculating section 109 calculates a length of the defect integrated by the integrative detection section 108. A method for calculating the length of the defect will be described later.

As discussed above, the ultrasonic testing image 111 is an image of an echo of an ultrasonic wave propagated in the inspection target, and is generated by the ultrasonic testing device 7.

The inspection result data 112 refers to data indicating a result of a defect inspection carried out by the information processing device 1. Recorded in the inspection result data 112 is information indicating a result of determination of presence or absence of a defect, made by the comprehensive determination section 104, for the ultrasonic testing image 111 stored in the storage section 11. Further, for an ultrasonic testing image 111 determined as including a defect, the determination result as to the type of the defect made by the defect type determination section 106 is recorded in the inspection result data 112. Furthermore, information indicating the defect integrated by the integrative detection section 108, information indicating a length of the integrated defect calculated by the defect length calculating section 109, and information indicating a wall thickness of the tube-to-tubesheet weld calculated by the thickness calculating section 107 are recorded in the inspection result data 112.

Outline of Inspection

Figure 3:
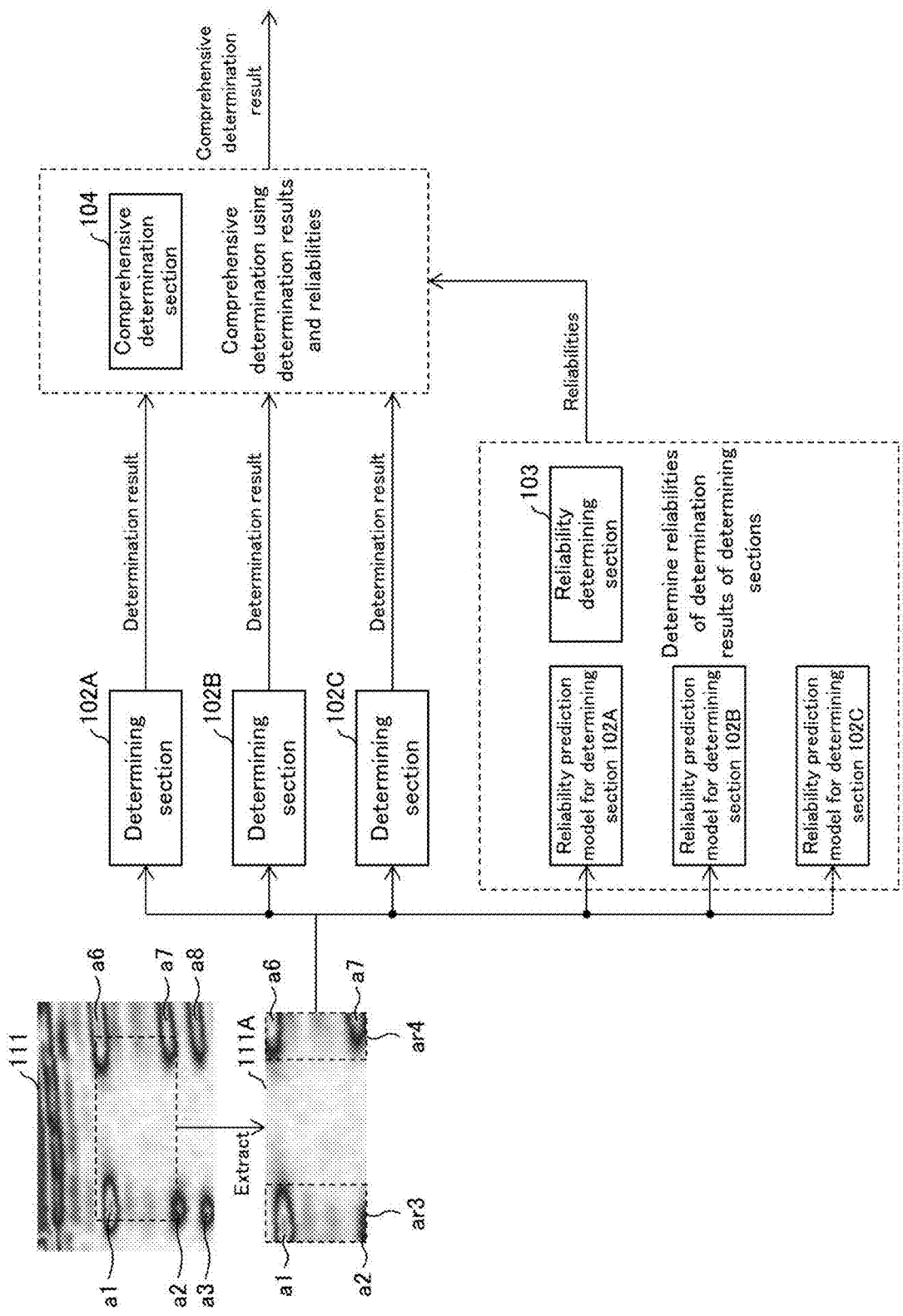
FIG. 3 is a view illustrating an outline of an inspection carried out by the information processing device.

The following description will discuss, with reference to FIG. 3, an outline of an inspection carried out by the information processing device 1. FIG. 3 is a view illustrating an outline of an inspection carried out by the information processing device 1. Note that FIG. 3 shows a process to be carried out after the ultrasonic testing image 111 generated by the ultrasonic testing device 7 is stored in the storage section 11 of the information processing device 1.

First, the inspection image generating section 101 extracts an inspection target area from the ultrasonic testing image 111 to generate an inspection image 111A. The extraction of the inspection target area may be carried out with use of an extraction model constructed by machine learning. The extraction model will be described with reference to FIG. 12.

The inspection target area refers to an area sandwiched between two peripheral echo areas ar3 and ar4 in each of which an echo coming from the periphery of an inspection target portion of the inspection target appears repeatedly. As shown in FIG. 2, in the periphery of the inspection target portion in the ultrasonic testing image 111, a given echo caused by the shape and/or the like of the peripheral part is repeatedly observed (echoes a1 to a4 and echoes a6 to a9). Thus, in accordance with the positions of the peripheral echo areas ar3 and ar4 in each of which such an echo repeatedly appears, it is possible to identify the area corresponding to the inspection target portion of the ultrasonic testing image 111. Note that it is not only the ultrasonic testing image 111 of the tube-to-tubesheet weld that a given echo appears in the periphery of an inspection target portion. Thus, the configuration that extracts, as the inspection target area, an area surrounded by the peripheral echo areas is applicable also to inspections on parts other than the tube-to-tubesheet weld.

Subsequently, the determining sections 102A, 102B, and 102C determine presence or absence of a defect in accordance with the inspection image 111A. The content of the determination will be described in detail later.

Then, the reliability determining section 103 determines reliabilities of the determination results given by the determining sections 102A, 102B, and 102C. Specifically, the reliability of the determination result given by the determining section 102A is determined in accordance with an output value obtained by inputting the inspection image 111A into a reliability prediction model for the determining section 102A. Similarly, the reliability of the determination result given by the determining section 102B is determined in accordance with an output value obtained by inputting the inspection image 111A into a reliability prediction model for the determining section 102B. The reliability of the determination result given by the determining section 102C is determined in accordance with an output value obtained by inputting the inspection image 111A into a reliability prediction model for the determining section 102C.

Then, the comprehensive determination section 104 comprehensively determines presence or absence of a defect in accordance with (i) the determination results given by the determining sections 102A, 102B, and 102C and (ii) the reliabilities of the determination results determined by the reliability determining section 103, and outputs a result of the comprehensive determination. This result is added to the inspection result data 112. The comprehensive determination section 104 may cause the output section 13 to output the result of the comprehensive determination.

In the comprehensive determination, the determination result given by the determining section 102 may be represented as a numerical value, and the reliability determined by the reliability determining section 103 may be used as a weight. For example, if the determining sections 102A, 102B, and 102C determine that a defect is present, "1" is output as the determination result. Meanwhile, if the determining sections 102A, 102B, and 102C determine that a defect is absent, "−1" is output as the determination result. The reliability determining section 103 outputs reliabilities within a numerical range from 0 to 1 (a value closer to 1 indicates a higher reliability).

In this case, the comprehensive determination section 104 may calculate a total value obtained by summing up values obtained by multiplying (i) the values ("1" or "−1") output by the determining sections 102A, 102B, and 102C by (ii) the reliabilities output by the reliability determining section 103. Then, the comprehensive determination section 104 may determine presence or absence of a defect in accordance with whether or not the total value thus calculated is higher than a given threshold.

For example, assume that the threshold is set at "0", which is intermediate between "1" indicating that a defect is present and "−1" indicating that a defect is absent. Assume also that the output values of the determining sections 102A, 102B, and 102C are respectively "1", "−1", and "1" and the reliabilities thereof are respectively "0.87", "0.51", and "0.95".

In this case, the comprehensive determination section 104 carries out calculation as follows: 1×0.87+(−1)×0.51+1×0.95. The result of the calculation is 1.31, which is higher than "0", i.e., the threshold. Thus, the result of the comprehensive determination made by the comprehensive determination section 104 indicates that a defect is present.

Correction of Reliabilities

It is empirical knowledge that an echo caused by a welding defect tends to appear at a location above a center position in the image area of the inspection image 111A. Thus, if the determining section 102 determines that a defect is present and an echo caused by a welding defect appears at a location above a center position in the image area of the inspection image 111A, it is considered that the determination result is highly likely to be correct.

Thus, in the image area of the inspection image 111A, an area where an echo caused by a welding defect often appears may be preliminarily set. Then, if an echo caused by a welding defect is detected in that area when the determining section 102 determines that a defect is present, the reliability determining section 103 may increase the reliability of the determination result. By correcting, in this manner, the reliability in consideration of the appearance tendency and/or characteristics of the defect, it is possible to make the reliability more appropriate.

For example, an area above a center of the image area of the inspection image 111A may be set as the above-described area. Then, if an echo caused by a welding defect is detected in that area, the reliability determining section 103 may add a given constant to the reliability calculated with use of the reliability prediction model. Meanwhile, if the echo caused by the welding defect is detected at a position outside the above-described area, the reliability determining section 103 may subtract a given constant from the reliability calculated with use of the reliability prediction model.

Note, however, that addition of a constant to a reliability is preferably carried out so that the reliability after the addition does not exceed 1. Note also that subtraction of a constant from a reliability is preferably carried out such that the reliability after the subtraction is not below 0.

Needless to say, the method for correcting the reliability is not limited to the above example. Alternatively, for example, the image area of the inspection image 111A may be divided into much smaller areas. Then, a value to be added to the reliability may be set higher, as a position of an echo caused by a welding defect is in an area where a welding defect appears with a higher frequency. Further alternatively, for example, a value proportional to a distance between a position of a detected echo and a position where a welding defect appears with a highest frequency may be added to the reliability. Still further alternatively, a value inversely proportional to that distance may be subtracted from the reliability.

The reliability may be corrected in consideration of an element(s) other than the position. For example, even in a case where it is determined that a defect is present and an echo caused by a welding defect is detected, it is suspected that the determination result may be incorrect if a pixel value of the echo is low. Thus, as the pixel value of the echo caused by the welding defect is lower, the value of the reliability may be corrected to be lower. Meanwhile, as the pixel value of the echo caused by the welding defect is higher, the value of the reliability may be corrected to be higher.

The above-described correction of the reliability can be suitably applied to the determination results given by the determining sections 102A and 102B. This is due to the following reason. That is, firstly, in the process in which the determining section 102A makes determination, a difference image is calculated, and the difference image can be used to calculate the position and/or pixel value of the echo caused by the welding defect. Secondly, in the process in which the determining section 102B makes determination, the echo caused by the welding defect is detected, and the detection result given thereby can be used.

Determination by Determining Section 102A

As discussed above, the determining section 102A determines presence or absence of a defect with use of a generated image obtained by inputting an inspection image into a generative model. The generative model is constructed by machine learning that uses, as training data, an image of an inspection target in which a defect is absent, so that the generative model generates a new image having a similar feature to that of an image input into the generative model. Note that the "feature" is any information obtained from an image. For example, a distribution state, a variance, and the like of pixel values in the image are also included in the "feature".

The generative model is constructed by machine learning that uses, as training data, an image of an inspection target in which a defect is absent. Thus, if an image of an inspection target in which a defect is absent is input into the generative model as the inspection image, it is highly likely that a new image having a similar feature to that of the inspection image is output as a generated image.

Meanwhile, if an image of an inspection target in which a defect is present is input into the generative model as the inspection image, it is highly likely that a resulting generated image has a different feature from that of the inspection image, regardless of the position, shape, and size of the defect captured in the inspection image.

As discussed above, (i) the generated image generated from the inspection image in which a defect is captured and (ii) the generated image generated from the inspection image in which no defect is captured differ from each other in that one does not properly restore the target image input into the generative model and the other properly restores the target image input into the generative model.

Thus, with the information processing device 1 that carries out comprehensive determination in consideration of the determination result given by the determining section 102A that determines presence or absence of a defect with use of the generated image generated by the generative model, it is possible to determine, with high accuracy, presence or absence of a defect having irregular position, size, shape, and/or the like.

Figure 4:
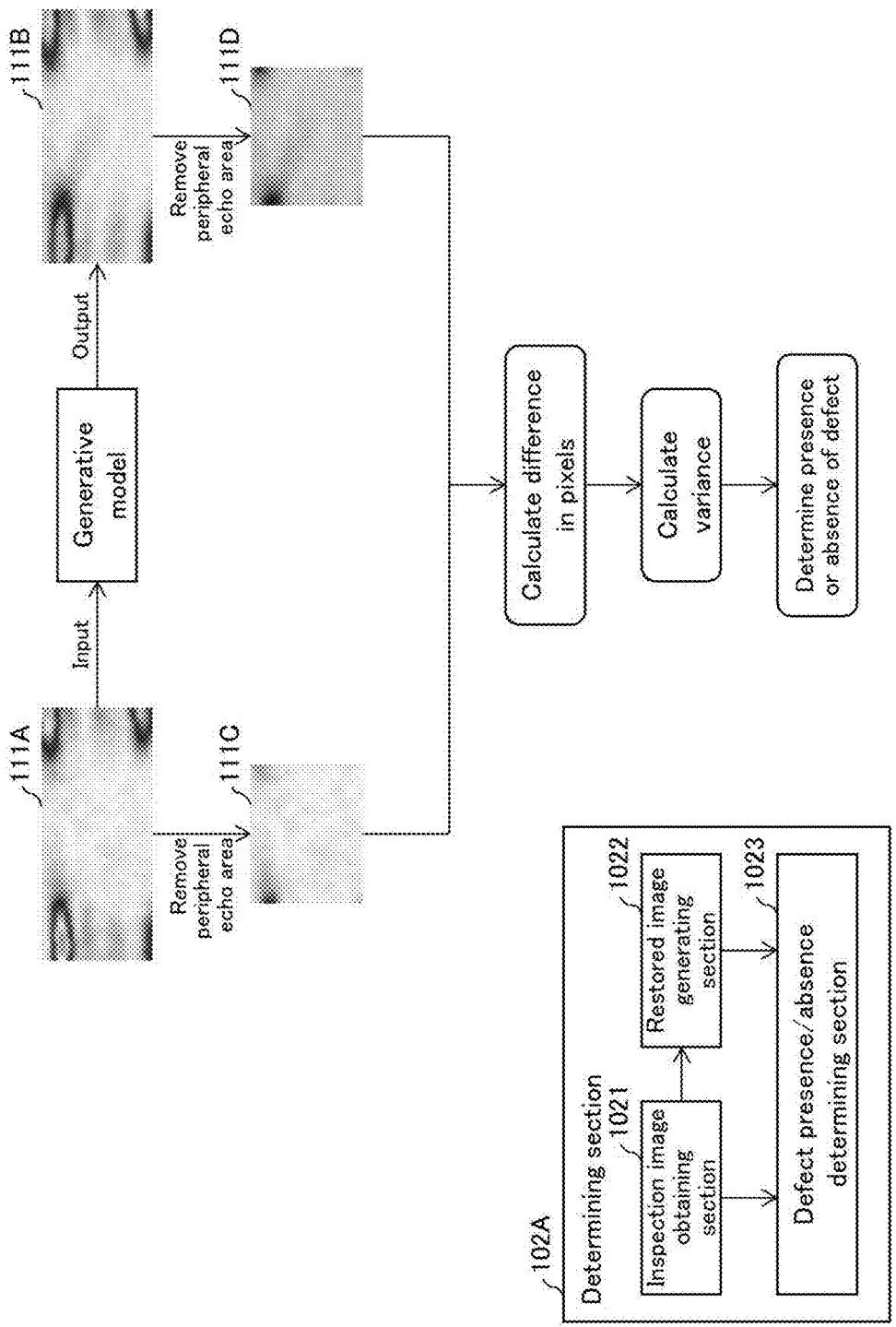
FIG. 4 is a view illustrating an example of a configuration of a determining section that carries out determination with use of a generative model and an example of a method for determination, carried out by the determining section, of presence or absence of a defect.

The following description will discuss, with reference to FIG. 4, details of determination made by the determining section 102A. FIG. 4 is a view illustrating an example of a configuration of the determining section 102A and an example of a method for determination, carried out by the determining section 102A, of presence or absence of a defect. As shown in FIG. 4, the determining section 102A includes an inspection image obtaining section 1021, a restored image generating section 1022, and a defect presence/absence determination section 1023.

The inspection image obtaining section 1021 obtains an inspection image. As discussed above, the information processing device 1 includes the inspection image generating section 101. Thus, the inspection image obtaining section 1021 obtains the inspection image generated by the inspection image generating section 101. Note that the inspection image may be generated by another device. In this case, the inspection image obtaining section 1021 obtains the inspection image generated by the another device.

The restored image generating section 1022 inputs, into the generative model, the inspection image obtained by the inspection image obtaining section 1021, so as to generate a new image having a similar feature to that of the inspection image thus input. Hereinafter, the image generated by the restored image generating section 1022 is called "restored image". The generative model used to generate the restored image is also called "autoencoder", and is constructed by machine learning that uses, as training data, an image of an inspection target in which a defect is absent (details thereof will be described later).

The defect presence/absence determining section 1023 determines whether or not the inspection target has a defect with use of the restored image generated by the restored image generating section 1022. Specifically, the defect presence/absence determining section 1023 determines that the inspection target has a defect, if a variance of pixel-by-pixel difference values between the inspection image and the restored image exceeds a given threshold.

In the method for determining, by the determining section 102A configured as above, presence or absence of a defect, the inspection image obtaining section 1021 first obtains the inspection image 111A. Then, the inspection image obtaining section 1021 transmits the obtained inspection image 111A to the restored image generating section 1022. As discussed above, the inspection image 111A is an image generated by the inspection image generating section 101 from the ultrasonic testing image 111.

Then, the restored image generating section 1022 inputs the inspection image 111A into the generative model, so as to generate a restored image 111B in accordance with a resulting output value. A method for generating the generative model will be described later.

Then, the inspection image obtaining section 1021 removes the peripheral echo areas from the inspection image 111A to generate a removed image 111C, and removes the peripheral echo areas from the restored image 111B to generate a removed image (restored) 111D. Note that the positions and sizes of the peripheral echo areas captured in the inspection image 111A are substantially the same, provided that the same inspection target is captured. Thus, the inspection image obtaining section 1021 may remove, as a peripheral echo area, a given range in the inspection image 111A. The inspection image obtaining section 1021 may analyze the inspection image 111A to detect the peripheral echo areas, and may remove the peripheral echo areas in accordance with a detection result.

As a result of removing the peripheral echo areas in the above-described manner, the defect presence/absence determining section 1023 determines presence or absence of a defect, with respect to a remaining image area obtained by removing the peripheral echo areas from the image area of the restored image 111B. Consequently, it is possible to determine presence or absence of a defect, without being affected by an echo coming from the periphery. This makes it possible to improve the accuracy in determination of presence or absence of a defect.

Next, the defect presence/absence determining section 1023 determines presence or absence of a defect. Specifically, the defect presence/absence determining section 1023 first calculates, in pixels, a difference between the removed image 111C and the removed image (restored) 111D. Next, the defect presence/absence determining section 1023 calculates a variance of the difference thus obtained. Then, the defect presence/absence determining section 1023 determines presence or absence of a defect in accordance with whether or not the value of the variance thus calculated exceeds a given threshold.

A difference value calculated for a pixel in which an echo caused by a defect appears is higher than difference values calculated for the other pixels. Thus, a variance of difference values calculated for a removed image 111C and a removed image (restored) 111D generated from an inspection image 111A where an echo caused by a defect is captured is large.

Meanwhile, a variance of difference values calculated for a removed image 111C and a removed image (restored) 111D generated from an inspection image 111A where an echo caused by a defect is not captured is relatively small. Meanwhile, in the case where the echo caused by the defect is not captured, a part having somewhat high pixel values due to the effects of noises and/or the like can occur, but a part having extremely high pixel values occurs with low probability.

The increase in variance of difference values is a phenomenon characteristic to a case where the inspection target has a defect. Thus, with the defect presence/absence determining section 1023 configured to determine that a defect is present if a variance of difference values exceeds a given threshold, it is possible to appropriately determine presence or absence of a defect.

For an inspection image 111A determined as including a defect, the defect type determining section 106 determines the type of the defect in accordance with the values of the difference in the pixels calculated by the defect presence/absence determining section 1023. Since the values of the difference in the pixels indicate the difference between the removed image 111C and the removed image (restored) 111D, these values are also called "difference image".

Note that a timing to remove the peripheral echo areas is not limited to the above-described example. Alternatively, for example, a difference image between the inspection image 111A and the restored image 111B may be generated, and the peripheral echo areas may be removed from the difference image.

Determination by Determining Section 102B

As discussed above, the determining section 102B analyzes pixel values in the inspection image, which is an image of the inspection target, to identify an inspection target portion in the inspection image, and determines presence or absence of a defect in accordance with pixel values in the inspection target portion thus identified.

In a conventional inspection involving use of an image, an inspector visually carries out a process of identifying an inspection target portion in an image and checking, in the identified portion, for a defect such as a damage and/or a gap that should not exist from a design standpoint. Such a visual inspection is requested to be automated, from the viewpoints of reduction of labor, achievement of stable accuracy, and/or the like.

The determining section 102B analyzes the pixel values in the image to identify an inspection target portion in the image, and determines presence or absence of a defect in accordance with pixel values in the inspection target portion thus identified. Thus, it is possible to automate the above-described visual inspection. Further, the information processing device 1 makes determination by comprehensively considering the determination result given by the determining section 102B and the determination result(s) given by other determining section(s) 102. Therefore, it is possible to determine, with high accuracy, presence or absence of a defect.

The following will give a more detailed description of the content of a process (numerical analysis) to be executed by the determining section 102B. First, in the inspection image, the determining section 102B identifies, as the inspection target portion, an area sandwiched between two peripheral echo areas (peripheral echo areas ar3 and ar4 in the example shown in FIG. 2) in each of which an echo coming from the periphery of the inspection target portion appears repeatedly. Then, the determining section 102B determines presence or absence of a defect in accordance with whether or not the identified inspection target portion includes an area (also called "defect area") constituted by pixel values not less than a threshold.

In order to detect the peripheral echo areas and the defect area, the determining section 102B may first binarize the inspection image 111A with use of a given threshold to generate a binarized image. Then, the determining section 102B detects the peripheral echo areas from the binarized image. For example, the inspection image 111A shown in FIG. 3 includes echoes a1, a2, a6, and a7. By binarizing the inspection image 111A with use of such a threshold that can divide these echoes and noise components from each other, the determining section 102B can detect these echoes in the binarized image. Then, the determining section 102B can detect edges of these echoes thus detected, and can identify, as the inspection target portion, an area surrounded by these edges.

To be more specific, the determining section 102B identifies a right edge of the echo a1 or a2 as a left edge of the inspection target portion, and identifies a left edge of the echo a6 or a7 as a right edge of the inspection target portion. These edges constitute boundaries between (i) the peripheral echo areas ar3 and ar4 and (ii) the inspection target portion. Similarly, the determining section 102B identifies an upper edge of the echo a1 or a6 as an upper edge of the inspection target portion, and identifies a lower edge of the echo a2 or a7 as a lower edge of the inspection target portion.

Note that, as in the ultrasonic testing image 111 shown in FIG. 2, an echo caused by a defect may appear at a location above the echoes a1 and a6. Thus, the determining section 102B may set the upper edge of the inspection target portion at a location above the upper edge of the echo a1 or a6.

Further, the determining section 102B can analyze the inspection target portion identified in the binarized image to determine whether or not the echo caused by the defect is captured therein. For example, in a case where the inspection target portion includes a continuous area constituted by a given number or more of pixels, the determining section 102B may determine that the echo caused by the defect is captured at a location where the continuous area exists.

Note that the above-described numerical analysis is an example, and the content of the numerical analysis is not limited to the above-described example. For example, in a case where there exists a significant difference between (i) a variance of pixel values in the inspection target portion having a defect and (ii) a variance of pixel values in the inspection target portion not having a defect, the determining section 102B may determine presence or absence of a defect in accordance with the value of the variance.

Determination by Determining Section 102C

As discussed above, the determining section 102C determines presence or absence of a defect in accordance with an output value obtained by inputting the inspection image into a decision model. The decision model is constructed by, e.g., carrying out machine learning with use of (i) training data generated by using an ultrasonic testing image 111 of an inspection target in which a defect is present and (ii) training data generated by using an ultrasonic testing image 111 of an inspection target in which a defect is absent.

The decision model can be constructed by any learning model suitable for image classification. For example, the decision model may be constructed by, e.g., convolutional neural network having excellent image classification accuracy.

Heat Map and Threshold Processing

Figure 5:
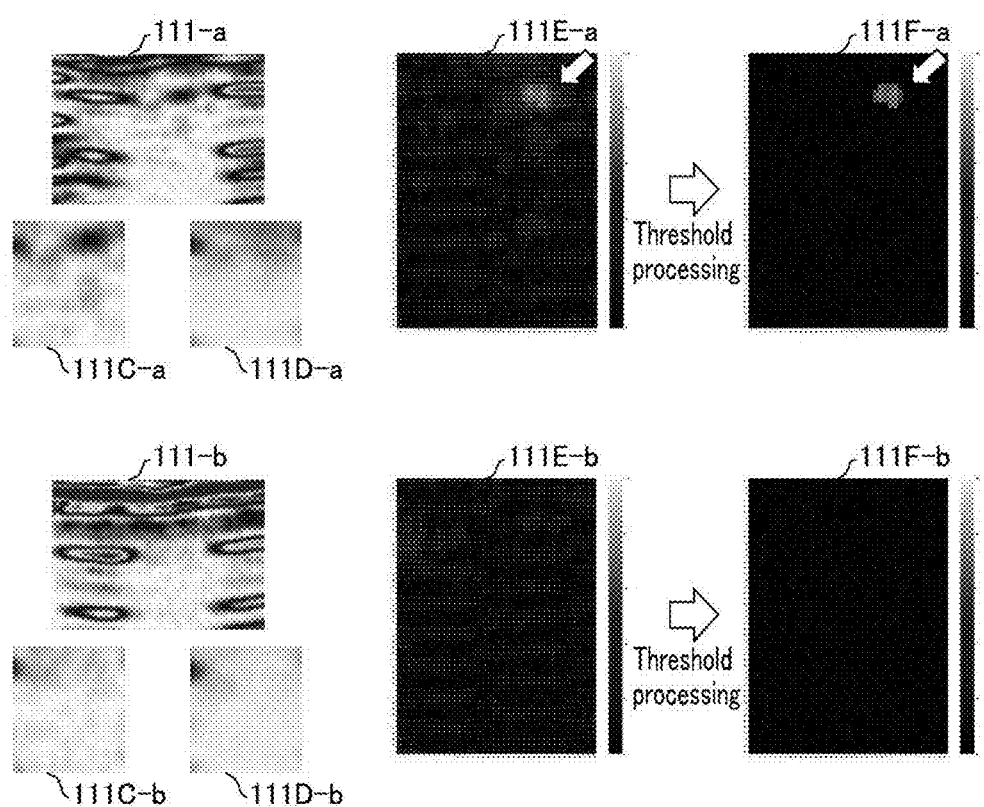
FIG. 5 is a view illustrating an example in which a heat map is generated from an ultrasonic testing image and threshold processing is carried out on the heat map thus generated.

As discussed above, the heat map is used to determine the type of the defect. Here, the following description will discuss, with reference to FIG. 5, the heat map generated by the heat map generating section 105 and the threshold processing carried out on the heat map thus generated. FIG. 5 is a view illustrating an example in which a heat map is generated from an ultrasonic testing image and threshold processing is carried out on the heat map thus generated. To be more specific, the upper part of FIG. 5 illustrates an example of an ultrasonic testing image 111-a of a portion of a tube-to-tubesheet weld in which a defect is present, whereas the lower part of FIG. 5 illustrates an example of an ultrasonic testing image 111-b of a portion of the tube-to-tubesheet weld in which a defect is absent.

As discussed with reference to FIG. 4, in the process in which the determining section 102A carries out determination, an inspection image 111A is generated from the ultrasonic testing image 111, and a restored image 111B is generated from the inspection image 111A. Then, a removed image 111C is generated from the inspection image 111A, and a removed image (restored) 111D is generated from the restored image 111B.

In the example shown in FIG. 5, a removed image 111C-a and a removed image (restored) 111D-a are generated from the ultrasonic testing image 111-a. A difference image is generated from the removed image 111C-a and the removed image (restored) 111D-a. The heat map generating section 105 generates a heat map in which pixels in the difference image are expressed by colors or gradations corresponding to the pixel values.

FIG. 5 shows a heat map 111E-a in which pixel values, from the lower limit to the higher limit, are expressed by gradations of colors from black to white. As indicated by the hollow arrow in the heat map 111E-a, an area corresponding to the defect (i.e., an area in which pixels having high pixel values are collected) is an area in which nearly white pixels are collected. Thus, in the heat map 111E-a, the area corresponding to the defect can be easily visually recognized.

Note, however, that the heat map 111E-a also has an area in which pixel values have become high due to noises and/or the like. Thus, it is preferable that the heat map generating section 105 carry out the threshold processing on the heat map thus generated, so as to correct the pixel values in the area in which the pixel values have become high due to noises and/or the like. For example, the heat map generating section 105 may set, at zero (black), a pixel value(s) in the heat map 111E-a which pixel value(s) is/are not more than a given threshold. Consequently, a heat map 111F-a from which a noise component(s) has/have been removed is generated. With the heat map 111F-a, the area corresponding to the defect can be more clearly recognized.

This is also true of an ultrasonic testing image 111-b of a portion in which a defect is absent. A removed image 111C-b and a removed image (restored) 111D-b are generated from the ultrasonic testing image 111-b, and a difference image is generated from the removed image 111C-b and the removed image (restored) 111D-b. Then, the heat map generating section 105 generates a heat map 111E-b of the difference image, and carries out the threshold processing on the heat map 111E-b to generate a heat map 111F-b. It is understood that comparison of the heat map 111F-a with the heat map 111F-b makes it possible to clearly determine presence or absence of a defect. It is also understood that the position of the defect can be clearly identified in the heat map 111F-a.

Type of Defect, Ultrasonic Testing Image, and Heat Map

As the defect in the tube-to-tubesheet weld, incomplete penetration in the first layer, incomplete fusion between welding passes, undercut, and a blowhole are known, for example. The incomplete penetration in the first layer refers to creation of a gap due to incomplete welding occurred in the vicinity of the tubesheet. The incomplete fusion between the welding passes refers to creation of a gap due to poor welding occurred while carrying out welding plural times. The undercut refers to such a defect that an end of a weld bead is hollowed out in the form of a notch. The blowhole refers to a spherical void formed in the welding metal.

The positions where these defects occur differ from each other. Thus, in accordance with the position in the ultrasonic testing image 111 at which position an echo caused by the defect appears, it is possible to determine the type of the defect. Similarly, it is also possible to determine the type of the defect in accordance with the position of the defect area in the heat map (preferably, the one after the threshold processing) generated from the ultrasonic testing image 111. As discussed above, the defect area is an area where an echo caused by the defect appears, and therefore pixel values therein are higher than those in the other areas.

Figure 6:
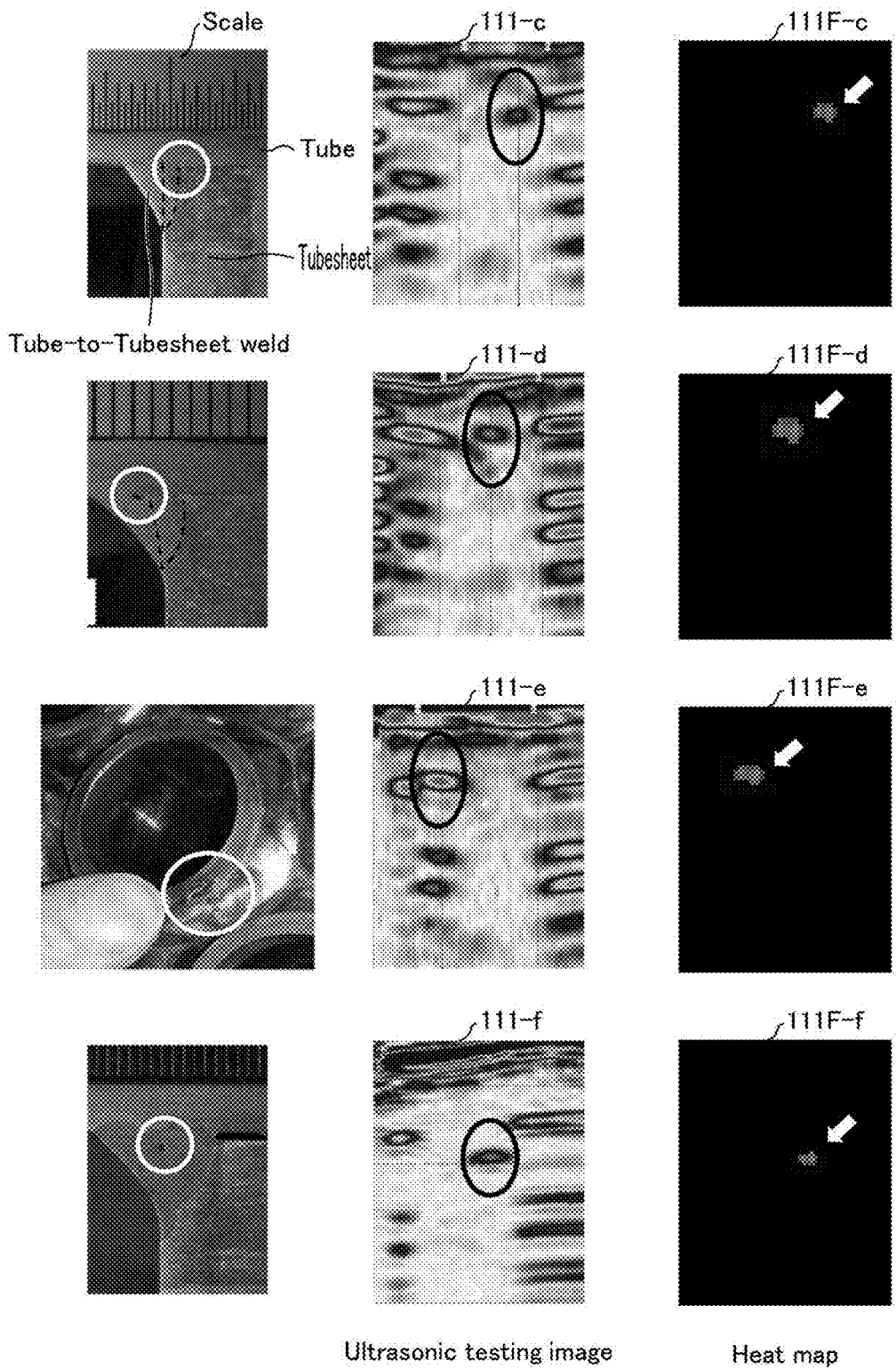
FIG. 6 is a view illustrating a relation between the position of a defect, an ultrasonic testing image, and a heat map.

The following description will discuss, with reference to FIG. 6, determination of the type of the defect in accordance with the position of the defect area. FIG. 6 is a view illustrating a relation between the position of the defect, the ultrasonic testing image, and the heat map. The view at the left end in the first row in FIG. 6 shows a cross section of a tube-to-tubesheet weld in which incomplete penetration in the first layer occurs. The left side in FIG. 6 is the tube end side, whereas the right side in FIG. 6 is the far side of the tube. That is, the tube extends in a left-right direction in FIG. 6. The tubesheet is located on a lower side relative to the tube wall. A scale is put on an inner wall surface (inner surface) of the tube so as to indicate a width of the tube-to-tubesheet weld.

In the view at the left end of the first row in FIG. 6, an area indicated by the broken line is a welded area of the tubesheet obtained by welding, an inverted triangle area on the left side of the welded area is an area made of a welding metal, and an area obtained by combining these areas is the tube-to-tubesheet weld. In the circled portion of the tube-to-tubesheet weld, a gap is created. This gap is positioned at a location that is in the vicinity of the surface of the tube and that is closer to the end of the tube-to-tubesheet weld which end is closer to the far side of the tube.

As shown in the view at the center of the first row shown in FIG. 6, an echo caused by the gap appears in an ultrasonic testing image 111-c of the portion including the gap. As shown in the view at the right end of the first row in FIG. 6, as indicated by the hollow arrow shown in this view, an area corresponding to the gap appears also in a heat map 111F-c generated from the ultrasonic testing image 111-c.

The view at the left end in the second row in FIG. 6 shows a cross section of a tube-to-tubesheet weld in which incomplete fusion between welding passes occurs. In the circled portion, a gap is created. This gap is positioned at a location that is in the vicinity of the surface of the tube and that is near a center part in a thickness direction of the tube-to-tubesheet weld.

As shown in the view at the center of the second row shown in FIG. 6, an echo caused by the gap appears in an ultrasonic testing image 111-d of the portion including the gap. As shown in the view at the right end of the second row in FIG. 6, as indicated by the hollow arrow shown in this view, an area corresponding to the gap appears also in a heat map 111F-d generated from the ultrasonic testing image 111-d. This area is located more leftward than that in the heat map 111F-c on the first row.

The view at the left end in the third row in FIG. 6 shows a tube-to-tubesheet weld in which undercut occurs, viewed from the tube end side. In the circled portion, a gap is created. This gap is positioned at a location that is in the vicinity of the surface of the tube and that is near an end of the tube-to-tubesheet weld which end is closer to the tube end side.

As shown in the view at the center of the third row shown in FIG. 6, an echo caused by the gap appears in an ultrasonic testing image 111-e of the portion including the gap. As shown in the view at the right end of the third row in FIG. 6, as indicated by the hollow arrow shown in this view, an area corresponding to the gap appears also in a heat map 111F-e generated from the ultrasonic testing image 111-e. This area is located more leftward than that in the heat map 111F-d on the second row.

The view at the left end in the fourth row in FIG. 6 shows a cross section of a tube-to-tubesheet weld in which a blowhole is created. In the circled portion, a gap is created. This gap is positioned at a location that is closer to the inside of the tube-to-tubesheet weld rather than to the surface of the tube, and the position of this gap in a left-right direction is in the vicinity of a center of the tube-to-tubesheet weld in its width direction.

As shown in the view at the center of the fourth row shown in FIG. 6, an echo caused by the gap appears in an ultrasonic testing image 111-f of the portion including the gap. As shown in the view at the right end of the fourth row in FIG. 6, as indicated by the hollow arrow shown in this view, an area corresponding to the gap appears also in a heat map 111F-f generated from the ultrasonic testing image 111-f. The position of this area in the left-right direction is close to that in the heat map 111F-d in the second row. However, the position of this area in an up-down direction is more downward than that in the heat map 111F-d in the second row.

As discussed above, there is a correlation between the type of the defect and the appearance of the heat map 111F. Thus, on the basis of the correlation, it is possible to construct a type decision model used to determine the type of the defect from the heat map 111F. Such a type decision model can be constructed by machine learning that uses, as training data, a heat map of a difference image generated from an inspection image of an inspection target having a defect of a known type. Then, the defect type determining section 106 can determine the type of the defect in accordance with an output value obtained by inputting, into such a decision model, a heat map generated by the heat map generating section 105.

As discussed above, a heat map representing, by colors or gradations, pixel values of pixels constituting a difference image reflects a difference in the type of the defect captured in an inspection image from which the difference image is obtained. Thus, with the above configuration, it is possible to automatically determine the type of the defect in an appropriate manner.

For example, a large number of heat maps like the heat map 111F-c shown in FIG. 6, which is generated from the ultrasonic testing image 111 of the portion in which incomplete penetration in the first layer occurs, may be prepared and used as training data. With this, it is possible to construct a type decision model that outputs a probability that the type of a defect is incomplete penetration in the first layer. Similarly, carrying out machine learning by using, as training data, a heat map generated from an ultrasonic testing image 111 of a portion in which another type of defect occurs makes it possible to construct a type decision model that outputs probabilities of various types of defects.

Thus, the defect type determining section 106 can determine the type of the defect in accordance with the output value obtained by inputting a heat map into such a type decision model. For example, the defect type determining section 106 may determine that a defect of the type corresponding to, among the probability values corresponding to various types of defects output from the type decision model, a highest probability value occurs.

Other Examples of Method for Determining Type of Defect

Figure 7:
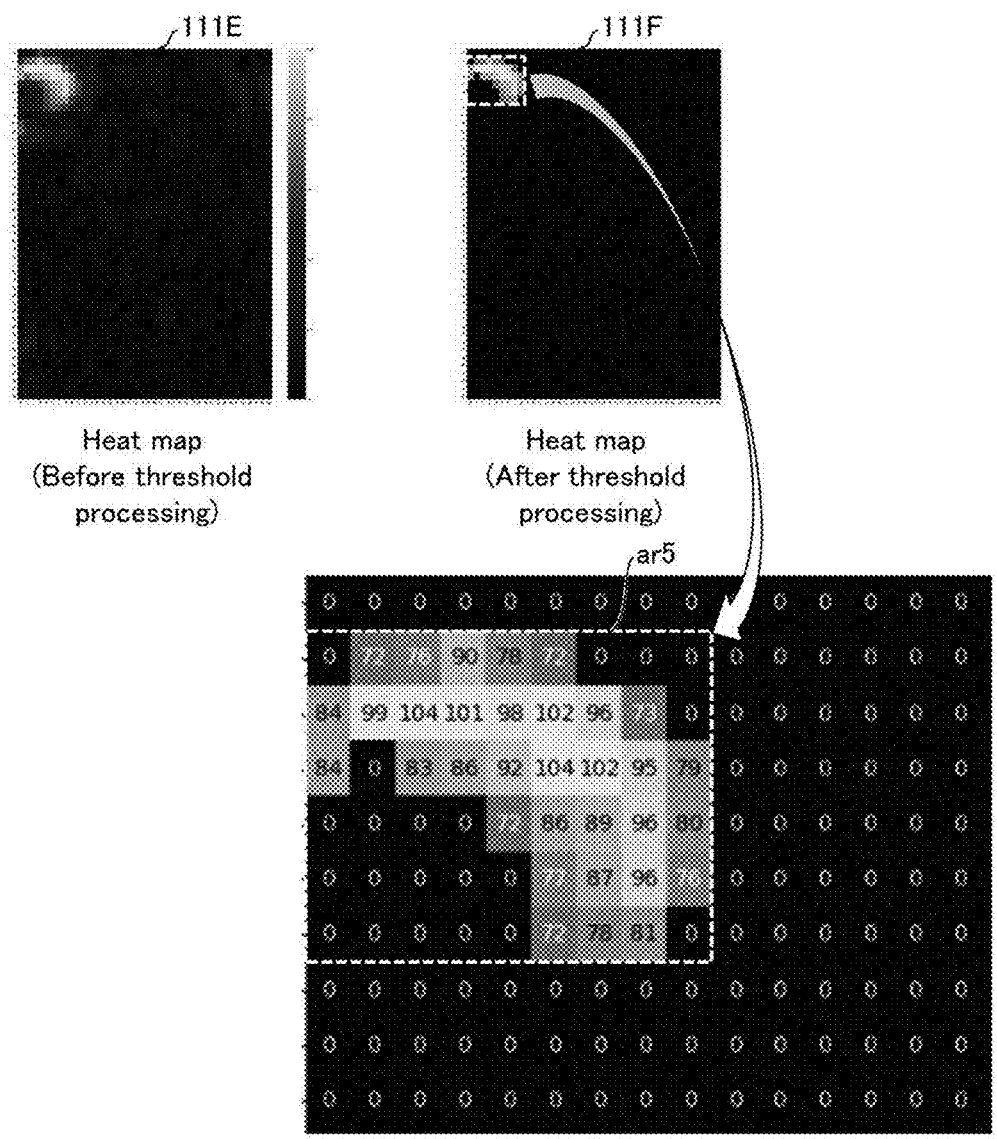
FIG. 7 is a view illustrating a method for detecting a defect area.
Figure 8:
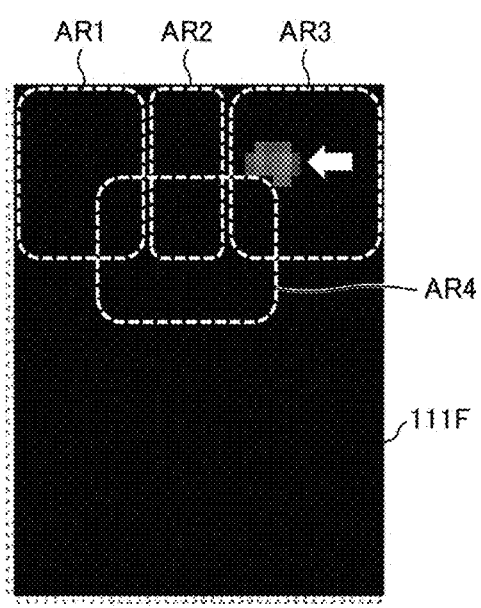
FIG. 8 is a view illustrating an example of areas set for respective types of defect.

The following description will discuss, with reference to FIGS. 7 and 8, other examples of the method for determining the type of the defect. In the below-described determination method, the defect type determining section 106 detects a defect area from a difference image, and determines the type of the defect related to the defect area, in accordance with the position in an image area of the difference image at which position the defect area is detected.

The following description will discuss, with reference to FIG. 7, a method for detecting a defect area. FIG. 7 is a view illustrating the method for detecting the defect area. FIG. 7 illustrates an example in which a defect area is detected with use of a heat map. However, the generation of the heat map is not essential, as discussed below.

FIG. 7 shows (i) a heat map 111E generated from an ultrasonic testing image 111 of an inspection target in which a defect is present and (ii) a heat map 111F obtained by carrying out threshold processing on the heat map 111E. FIG. 7 also shows an enlarged view of the upper left part of the heat map 111F. In this enlarged view, the pixels in the heat map 111F indicate their pixel values.

In order to detect the defect area, the defect type determining section 106 first detects, in the heat map 111F, a pixel having a highest pixel value. In the example shown in FIG. 7, the highest pixel value is 104. Thus, the pixel having this pixel value is detected. Next, the defect type determining section 106 detects a pixel(s) being adjacent to the detected pixel and having a pixel value(s) not less than a given threshold.

The defect type determining section 106 carries out such a process repeatedly until no adjacent pixel having a pixel value not less than the threshold is detected. Consequently, the defect type determining section 106 can detect, as a defect area, a continuous area constituted by the pixels each having a pixel value not less than the given threshold. The defect type determining section 106 may detect, as the defect area, a quadrangular area ar5 including the defect area detected in the above-described manner.

The above-discussed process can be carried out, if there is data indicating pixel-by-pixel difference values, i.e., a difference image between the inspection image 111A and the restored image 111B. In other words, by repeating the process of (i) detecting a pixel having a highest pixel value in the difference image and (ii) detecting a pixel(s) being adjacent to that pixel and having a pixel value(s) not less than the given threshold, it is possible to detect a defect area. Therefore, as discussed above, it is not essential to generate the heat map 111E or the heat map 111F in order to detect the defect area.

As discussed above, the defect type determining section 106 detects, as a defect area, an area constituted by a plurality of pixels which are included in a difference image and which have pixel values not less than a threshold. In the difference image, the pixel values of the pixels in the defect area are higher than the pixel values in the other areas. Thus, with the above configuration, it is possible to automatically detect an appropriate defect area.

As discussed with reference to FIG. 6, as a defect in a welded portion, various types of defects are known, such as incomplete penetration in the first layer and incomplete fusion between welding passes. The difference in the defect type appears as a difference in position in an ultrasonic testing image. By utilizing this, the defect type determining section 106 determines the type of a defect related to a defect area, in accordance with the position in the image area of the difference image at which position the defect area is detected. With this, it is possible to automatically determine the type of the defect.

For example, if areas corresponding to various types of defects are preliminarily set in a difference image, the defect type determining section 106 can determine the type of the defect in accordance with which of the areas the defect area detected in the above-described manner is contained.

FIG. 8 is a view illustrating an example of areas set for respective types of defect. In the example shown in FIG. 8, an area AR1 corresponding to undercut is set at the upper left corner, an area AR2 corresponding to incomplete fusion between welding passes is set at the upper center, and an area AR3 corresponding to incomplete penetration in the first layer is set at the upper right corner in the heat map 111F. In addition, an area AR4 corresponding to a blowhole is set at a location slightly above the center. These areas may be set in advance in accordance with, e.g., analysis on a difference image and/or a heat map that is/are based on inspection images of portions in which various defects are present. In the example shown in FIG. 8, the defect area indicated by the hollow arrow is detected in the area AR3. Thus, the defect type determining section 106 determines that this defect is caused by incomplete penetration in the first layer.

In the example shown in FIG. 8, a part of the area AR4, which corresponds to a blowhole, overlaps parts of the areas AR1 to AR3. In this manner, an area used to determine the type of defect may be set so as to partially overlap another area.

In this case, when a defect area is detected in an area where a plurality of areas overlap each other, the defect type determining section 106 may determine, as a determination result regarding the type of the defect, all the types corresponding to the plurality of areas. For example, when a defect area is detected in an area where the areas AR1 and AR4 overlap each other, the defect type determining section 106 may output, as a determination result, both undercut and a blowhole.

Further, the defect type determining section 106 may narrow down the determination results of the type of the defect in accordance with whether or not a condition(s) specific to each type of defect is/are satisfied. For example, in a case of a defect that is characterized by shape, a condition related to the shape may be set. Meanwhile, in a case of a defect that is characterized by size, a condition related to the size may be set.

Specifically, for example, a blowhole is such a defect that causes a spherical cavity, a diameter of which is generally not more than 2 mm. Thus, in a case where a single ultrasonic testing image 111 covers a range of approximately 1 mm of the inspection target in width, a single blowhole will fit within two or three ultrasonic testing images 111 or so. Therefore, if a defect is detected consecutively in ultrasonic testing images 111 respectively corresponding to adjacent parts of the inspection target and the number of ultrasonic testing images 111 is not more than three, the defect may possibly be a blowhole. Meanwhile, if the number of ultrasonic testing images 111 in which a defect is detected consecutively is not less than four, it is highly likely that the defect is not a blowhole.

Thus, in a case where a defect area is detected in an area where the area AR4 and another area overlap each other, the defect type determining section 106 may determine that the type of the defect is a blowhole, if the condition that the number of ultrasonic testing images 111 in which the defect is consecutively detected is not more than a threshold (e.g., 3) is satisfied.

For example, assume that, in the example shown in FIG. 8, a defect area is detected in an area where the areas AR4 and AR2 overlap each other. In this case, if the number of ultrasonic testing images 111 in which the defect is consecutively detected is not more than the threshold, the defect type determining section 106 may determine that the type of the defect is a blowhole. Meanwhile, if the number of ultrasonic testing images 111 in which the defect is consecutively detected exceeds the threshold, the defect type determining section 106 may determine that the type of the defect is incomplete fusion between welding passes.

As discussed above, a blowhole has a spherical shape. Thus, if a single blowhole is detected across a plurality of ultrasonic testing images 111, the peak values of the echoes caused by the blowhole observed in the ultrasonic testing images 111 often differ from each other. Such a difference in peak value appears as a difference in pixel value in the ultrasonic testing images 111. For example, suppose that a single blowhole is detected across three ultrasonic testing images 111. In this case, if a peak value of an echo caused by the blowhole observed in the intermediate one of the three ultrasonic testing images 111 is 50%, a peak value of an echo caused by the blowhole in each of the ultrasonic testing images 111 before and after the intermediate one is 30%, which is lower than that of the intermediate one.

Thus, in a case where a defect area is detected in an area where the area AR4 and another region overlap each other, the defect type determining section 106 may determine that the type of the defect is a blowhole, if the condition that there is a difference between the pixel values in the defect areas in the ultrasonic testing images 111 in which the defect is consecutively detected is satisfied. For example, the defect type determining section 106 may calculate average values of the pixel values in the pixels included in the defect areas in the ultrasonic testing images 111. Then, if a difference between the average values is not less than a threshold, the defect type determining section 106 may determine that there is a difference.

Note that the defect type determining section 106 may carry out either or both of (i) determination involving use of the type decision model and (ii) determination in accordance with which of the areas the defect area is contained. Carrying out both of the determinations makes it possible to enhance the accuracy in the determination result regarding the type.

Integration of Defects

The tube-to-tubesheet weld surrounds the tube by 360 degrees. Thus, as discussed above, ultrasonic testing images 111 of various parts of the tube-to-tubesheet weld are generated by circumferentially moving, in the tube, the probe by a given degree. Then, in accordance with the ultrasonic testing images 111, a defect is detected. In such a case, there may be a case where a single continuous defect is captured in a plurality of ultrasonic testing images and accordingly the defect is determined as two or more defects, although the entity of the defect is a single defect.

In order to deal with this, the integrative detection section 108 integrates the defects captured in the plurality of ultrasonic testing images 111 so as to detect the defects as a single defect. To be more specific, if the comprehensive determination section 104 determines that a defect is present in a plurality of ultrasonic testing images 111 corresponding to parts of the tube-to-tubesheet weld which parts are adjacent to each other, the integrative detection section 108 detects, as a single defect, the defects captured in the plurality of ultrasonic testing images 111. This makes it possible to carry out detection appropriate to the entity of the defect.

The following description will discuss a method for integration of defects with reference to FIG. 9. FIG. 9 is a view illustrating a method for integrating defects captured in a plurality of ultrasonic testing images 111 to detect the defects as a single defect. The upper left part of FIG. 9 illustrates a transverse cross section of a tube and a tube-to-tubesheet weld. The lower left part of FIG. 9 illustrates a longitudinal cross section of the tube, the tube-to-tubesheet weld, and a tubesheet.

In the example shown in FIG. 9, a welding defect occurs in a wide range along an outer wall surface of the tube. When measurement of an echo is carried out while circumferentially moving the probe by a given degree along an inner wall surface of the tube, measurement results obtained in a range in which a welding defect occurs reflect echoes from the welding defect. Consequently, as shown in the right part of FIG. 9, echoes caused by the welding defect appear in ultrasonic testing images 111g to 111i generated in accordance with the measurement results. Thus, in the determination of presence or absence of a defect from the ultrasonic testing images 111g to 111i, the comprehensive determination section 104 determines that a defect is present.

Here, the ultrasonic testing images 111g to 111i respectively correspond to parts of the tube-to-tubesheet weld which parts are adjacent to one another. Thus, the integrative detection section 108 detects, as a single defect, the defects captured in the ultrasonic testing images 111g to 111i that are determined as including a defect by the comprehensive determination section 104.

Note that the integrative detection section 108 may integrate the defects, provided that the positions of the defects detected in the ultrasonic testing images 111g to 111i are the same or close to each other. As discussed above, the position of the defect varies depending on the type. Thus, the integrative detection section 108 may integrate these defects, provided that the defects of the same type are detected in the ultrasonic testing images 111g to 111i. With these configurations, it is possible to enhance the accuracy in defect integration.

The defect length calculating section 109 calculates a length of the defect integrated by the above-described processing. For example, the defect length calculating section 109 may calculate the length of the defect by multiplying (i) a length of a defect per ultrasonic testing image 111 by (ii) the number of defects integrated by the integrative detection section 108.

For example, assume the following situation. That is, for a tube-to-tubesheet weld formed to surround a tube by 360 degrees, echo measurement is carried out 360 times by circumferentially moving the probe by 1 degree along an inner wall surface of the tube around a center axis of the tube, so that 360 ultrasonic testing images 111 are generated. In such a situation, a defect captured in a single ultrasonic testing image 111 has a length of approximately (outer diameter of tube)×π×1/360. Thus, in a case where three ultrasonic testing images 111g to 111i are integrated as in the manner shown in FIG. 9, the defect length calculating section 109 may calculate the length of the defect as follows: (outer diameter of tube)×π×3×1/360. Note that π denotes pi.

Calculation of Thickness of Tube-to-Tubesheet Weld

The following description will discuss, with reference to FIG. 10, a method for calculating a thickness (wall thickness) of a tube-to-tubesheet weld. FIG. 10 is a view illustrating the method for calculating the thickness of the tube-to-tubesheet weld. The lower part of FIG. 10 illustrates a longitudinal cross section of the tube-to-tubesheet weld, and the upper part of FIG. 10 illustrates an ultrasonic testing image 111 of the tube-to-tubesheet weld.

A thickness of the tube-to-tubesheet weld shown in the lower part of FIG. 10, including a part penetrated into the tubesheet, is X. As discussed with reference to FIG. 2, the area of the ultrasonic testing image 111 in which area the tube-to-tubesheet weld is captured is an area sandwiched between two peripheral echo areas ar3 and ar4 in each of which an echo coming from the periphery of the peripheral echo area appears repeatedly. Thus, the thickness X of the tube-to-tubesheet weld can be calculated on the basis of a distance Xi between the peripheral echo areas ar3 and ar4.

The distance Xi may be calculated by the thickness calculating section 107 analyzing the ultrasonic testing image 111. Alternatively, since the analysis of the ultrasonic testing image 111 is carried out by the determining section 102B, it is preferable to use the result of the analysis.

To be more specific, as discussed with reference to FIG. 3, the determining section 102B detects the peripheral echo areas ar3 and ar4 in the inspection image 111A generated from the ultrasonic testing image 111, and carries out, with respect to an area sandwiched between these areas, determination of presence or absence of a defect. Thus, in accordance with the result of the determination made by the determining section 102B, the thickness calculating section 107 can calculate the distance Xi from the right edge of the peripheral echo area ar3 to the left edge of the peripheral echo area ar4 detected by the determining section 102B. Further, if a reduced scale of the inspection image 111A is obtained in advance, the thickness calculating section 107 can use the reduced scale to calculate the thickness X of the tube-to-tubesheet weld.

As discussed above, the determining section 102B detects the peripheral echo areas ar3 and ar4 in the process of determining presence or absence of a defect. Thus, the thickness calculating section 107 can use the result of detection of the peripheral echo areas ar3 and ar4 carried out by the determining section 102B to calculate the thickness of the inspection target portion.

Example of Output of Inspection Result

Figure 11:
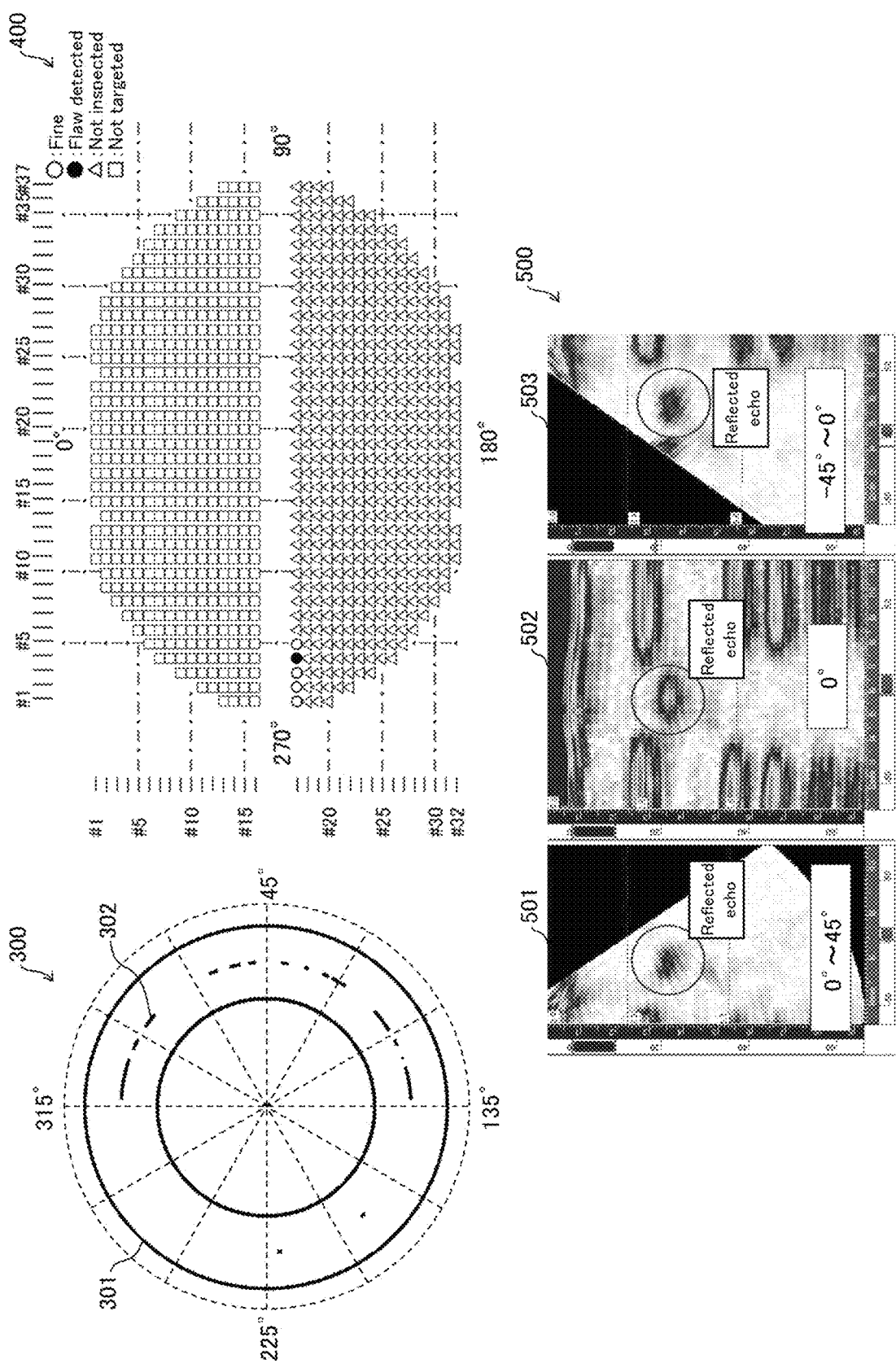
FIG. 11 is a view illustrating an example of output of an inspection result.

The determination result of presence or absence of a defect in the inspection target made by the information processing device 1 is output via the output section 13. Here, an example of output of an inspection result will be explained with reference to FIG. 11. FIG. 11 shows an example of output of an inspection result.

The upper left part of FIG. 11 shows a defect map 300. The defect map 300 includes a doughnut-shaped area 301 showing a tube-to-tubesheet weld viewed from the tube end side, with line segments 302 indicating detected defects drawn. The defect map 300 can facilitate recognition of the distribution of the defects in the tube-to-tubesheet weld.

The upper right part of FIG. 11 shows a tubesheet map 400. The tubesheet map 400 schematically shows a state of a heat exchanger including a tubesheet to which many tubes are welded as shown in FIG. 2, viewed from the tube end side. The tubesheet map 400 shows inspection results by drawing, at the location of each tube, a graphic indicating a result of a defect inspection carried out at a tube-to-tubesheet weld of that tube.

Specifically, a white circle is drawn at the position of a tube where no defect was detected as a result of the inspection, whereas a black circle is drawn at the position of a tube where a flaw (defect) was detected as a result of the inspection. This can facilitate recognition of the distribution of the tube-to-tubesheet welds where defects have occurred. In the tubesheet map 400, a triangle is drawn at the position of a tube which has not been inspected yet, and a square is drawn at the position of a tube which is not a target to be inspected. In this manner, various information regarding inspections may also be included in the tubesheet map 400.

The lower part of FIG. 11 shows an ultrasonic testing image set 500. The ultrasonic testing image set 500 includes three ultrasonic testing images (501 to 503). The ultrasonic testing image 501 is obtained by sector scanning on the tube end side, the ultrasonic testing image 502 is obtained by linear scanning, and the ultrasonic testing image 503 is obtained by sector scanning on the far side of the tube.

Note that the linear scanning is scanning carried out in a flaw detecting direction perpendicular to a center axis of the tube. The above-described ultrasonic testing image 111 is also obtained by linear scanning. The sector scanning on the tube end side is scanning with which an ultrasonic wave is propagated in a flaw detecting direction that is inclined toward the far side of the tube from the direction perpendicular to the center axis of the tube. The sector scanning on the far side of the tube is scanning with which an ultrasonic wave is propagated in a flaw detecting direction that is inclined toward the tube end side from the direction perpendicular to the center axis of the tube.

In each of these ultrasonic testing images, a reflected echo corresponding to the detected defect is marked. Indicating the ultrasonic testing images with the markings as inspection results in this manner can facilitate recognition of the position and/or the like of the defects.

All of the ultrasonic testing images 501 to 503 are obtained by scanning the same position in the tube-to-tubesheet weld. However, since the flaw detecting directions of the ultrasonic testing images 501 to 503 differ from each other, the defects therein look differently. Therefore, the information processing device 1 determines presence or absence of a defect in a plurality of ultrasonic testing images 111 obtained by scanning in different flaw detecting directions. Then, if the information processing device 1 determines that a defect is present in any of the flaw detecting directions, the information processing device 1 may determine, as a final determination result, that a defect is present even when no defect is found in the other flaw detecting directions. This can reduce the probability that a defect is missed. Alternatively, the information processing device 1 may determine presence or absence of a defect, with respect to a composite image that is a composite of (i) an ultrasonic testing image obtained by linear scanning and (ii) an ultrasonic testing image obtained by sector scanning.

The information processing device 1 may output, as an inspection result, all of or only apart of the defect map 300, the tubesheet map 400, and the ultrasonic testing image set 500. The information processing device 1 may also output, as an inspection result, information indicating the determination result regarding the type of the defect, for example. Needless to say, these are merely examples. The information processing device 1 may output a determination result in any form with which a person can recognize the content thereof.

Flow of Process Before Inspection

Before carrying out a defect inspection with use of the information processing device 1, it is necessary to construct various models used in the inspection and to determine a threshold. The description here will discuss, with reference to FIG. 12, a flow of a process of constructing various models used in an inspection and determining a threshold. FIG. 12 is a view illustrating an example of the process of constructing various models used in an inspection and determining a threshold. These processes may be carried out by the information processing device 1 or by another computer.

In S1, ultrasonic testing images 111 having been subjected to smoothing processing are obtained. The ultrasonic testing images 111 include ultrasonic testing images 111 obtained from inspection targets in which a defect is present and ultrasonic testing images 111 obtained from inspection targets in which a defect is absent. The ultrasonic testing images 111 obtained from the inspection targets in which a defect is present are classified in accordance with their types of defects.

Note that the smoothing processing refers to a process of smoothing a change in pixel value between pixels adjacent to each other. The smoothing processing may be carried out either by the information processing device 1 or the ultrasonic testing device 7. The smoothing processing is not essential. However, it is preferable to carry out the smoothing processing, since carrying out the smoothing processing makes it easier to distinguish an echo caused by a defect from a noise component.

In S2, an extraction model is constructed. The extraction model is constructed by machine learning that uses training data in which an ultrasonic testing image 111 is associated with extraction area information as correct data. The extraction area information is information indicating an area to be extracted from the ultrasonic testing image 111, that is, information indicating an inspection target area. The extraction area information may be the one generated in the following manner. That is, for example, the ultrasonic testing image 111 is displayed by a display device, an operator inputs an area to be extracted, and the extraction area information is generated in accordance with the content of the input.

The extraction model can be constructed by any learning model suitable for extraction of an area from an image. For example, the extraction model may be constructed by You Only Look Once (YOLO) or the like that involves excellent extraction accuracy and excellent processing speed.

The area to be extracted can be any area that includes a tube-to-tubesheet weld, which is an inspection target portion. It is preferable that the area to be extracted also include at least apart of an area where an echo coming from its periphery appears. This is preferable because: if the inspection target portion has no defect, no feature point that can be machine-learned may be observed in that portion of the ultrasonic testing image 111; in such a case, it is difficult to construct an extraction model. For example, in the ultrasonic testing image 111 shown in FIG. 2, an area(s) including parts of the echoes a1, a2, a6, and a7 may be set as the area to be extracted. With this, it is possible to construct the extraction model that can extract an area which includes the tube-to-tubesheet weld and the echoes coming from the periphery.

In S3, the extraction model constructed in S2 is used to generate images for learning (i.e., learning images) from the ultrasonic testing images 111 obtained in S1. In S2, if an extraction model is constructed by machine learning that uses, as correct data, an area including an area where an echo coming from the periphery appears, this extraction model is used to extract the inspection target area. As shown in FIG. 2, an echo from the periphery of the inspection target portion has a feature that can be machine-learned. Therefore, with this configuration, it is possible to extract the inspection target portion automatically with high accuracy. Note that, since the learning images are generated with use of the same extraction model as that used for the inspection image 111A, the learning images have similar appearances to that of the inspection image 111A (for the appearance of the inspection image 111A, see FIG. 3).

In S4 and its subsequent step(s), the learning images generated in S3 are used for determination of a threshold and construction of a model related to the determining sections 102. In S4, a generative model is constructed. The generative model is constructed by machine learning that uses, as training data, the learning images generated from the ultrasonic testing images 111 of the inspection targets in which a defect is absent. As discussed above, the generative model may be an autoencoder. Alternatively, the generative model may be a model obtained by improving or modifying the autoencoder. For example, the generative model may be a variational autoencoder or the like.

If, in S2, the extraction model is constructed by machine learning that uses, as correct data, the area including the area where the echo coming from the periphery appears, the training data to be used to construct the generative model also includes the area where the echo coming from the periphery appears. In each of the ultrasonic testing images 111 of the inspection targets in which a defect is absent, the inspection target area does not include any echo, and thus does not have enough feature points to be machine-learned. However, by using the training data including the area where the echo coming from the periphery appears, it is possible to construct an appropriate generative model.

In S5, a threshold used by the determining section 102A to determine presence or absence of a defect is determined. Specifically, first, test images are input into the generative model constructed in S4 to generate a restored image. The test images are, among the learning images generated in S3, the ones that are not used to construct the generative model. The test images include test images generated from the ultrasonic testing images 111 of the inspection targets in which a defect is absent and test images generated from the ultrasonic testing images 111 of the inspection targets in which a defect is present. The test images generated from the ultrasonic testing images 111 of the inspection targets in which a defect is present are classified in accordance with their types.

Next, for the restored image generated in the above-described manner and the test images from which the restored image is generated, a difference between the restored image and the test images is calculated in pixels, and a variance of the difference is calculated. Then, a threshold is defined so that (i) variance values calculated for a plurality of test images generated from the ultrasonic testing images 111 of the inspection targets in which a defect is absent and (ii) variance values calculated for a plurality of test images generated from the ultrasonic testing images 111 of the inspection targets in which a defect is present can be distinguished from each other.

In S6, a reliability prediction model for the determining section 102A, which carries out determination with use of the generative model constructed in S4 and the threshold determined in S5, is constructed by machine learning. The machine learning uses training data in which a test image is associated with, as correct data, information indicating whether or not a result of determination made by the determining section 102A in accordance with that test image is correct. The test image may be the one generated from an ultrasonic testing image 111 for which presence or absence of a defect is known.

In response to inputting the inspection image 111A into the reliability prediction model created in this manner, a value is output which ranges from 0 to 1 and which indicates the probability that a result of determination carried out by the determining section 102A with use of the inspection image 111A is correct. Thus, the reliability determining section 103 may use an output value from the reliability prediction model as the reliability of the determination result given by the determination result 102A.

In S7, a type decision model is constricted by using, as training data, heat maps generated respectively from test images of various types of defects. As discussed with reference to FIG. 6, the heat maps show features corresponding to the types of the defects. Thus, by carrying out machine learning with use of the heat maps as training data, it is possible to construct a type decision model.

The type decision model can be constructed by any learning model suitable for image classification. For example, the type decision model may be constructed by, e.g., convolutional neural network that has excellent image classification accuracy.

In S8, areas for type determination are set. Specifically, first, from the heat maps corresponding to the various types of defects and being generated in S7, defect areas where echoes caused by the defects are captured are detected. Then, in an image area of each heat map, an area where a defect area of a certain type is detected is identified as an area where the defect of the certain type appears. This process is carried out for each of the types that a user wants to carry out determination. With this, as in the example shown in FIG. 8, it is possible to set, for each type of defect, an area where that type of defect appears.

Note that either of S7 and S8 may be omitted. If the process in S7 is omitted, the defect type determining section 106 determines the type of the defect in accordance with the areas set in S8. Meanwhile, if the process in S8 is omitted, the defect type determining section 106 determines the type of the defect with use of the type decision model constructed in S7.

In S9, a threshold to be used by the determining section 102B for numerical analysis is determined with use of the learning images generated in S3. For example, in a case where the determining section 102B carries out banalization processing, a threshold used for the banalization processing is determined.

In S10, a reliability prediction model for the determining section 102B, which carries out determination with use of the threshold determined in S9, is constructed by machine learning. The machine learning uses training data in which a test image is associated with, as correct data, information indicating whether or not a result of determination made by the determining section 102B in accordance with that test image is correct. The test image may be the one generated from an ultrasonic testing image 111 for which presence or absence of a defect is known.

In S11, a decision model used by the determining section 102C to determine presence or absence of a defect is constructed by machine learning. The machine learning uses training data in which a learning image generated in S3 is associated with, as correct data, information indicating presence or absence of a defect. With this, it is possible to construct a decision model that outputs, in response to inputting the inspection image 111A into the decision model, a value indicating the probability that a defect is present or a value indicating the probability that a defect is absent.

In S12, a reliability prediction model for the determining section 102C, which carries out determination with use of the decision model constructed in S11, is constructed by machine learning. The machine learning uses training data in which a test image is associated with, as correct data, information indicating whether or not a result of determination made by the determining section 102C in accordance with that test image is correct. The test image may be the one generated from an ultrasonic testing image 111 for which presence or absence of a defect is known.

As discussed above, the reliability prediction model for the determining section 102A can be constructed by machine learning that uses training data in which the test image for which the determining section 102A has carried out determination for presence or absence of a defect is associated with, as correct data, information indicating whether or not the result of the determination is correct. This is also true of the reliability prediction model for the determining section 102B and the reliability prediction model for the determining section 102C.

Each of the reliability prediction models described above has learned correspondence between (i) the test image for which the determining section 102 has carried out determination and (ii) the information indicating whether or not the result of the determination is correct. Thus, an output value obtained in response to inputting the inspection image 111A into the reliability prediction model indicates the degree of certainty of a determination result obtained when the determining section 102 carries out determination with use of the inspection image 111A.

Thus, the reliability determining section 103 can determine the reliabilities of the determination results of the determining sections 102 in accordance with output values obtained by inputting the inspection image 111A into the reliability prediction models for the determining sections 102, and accordingly can set reliabilities appropriate for the previous determination history.

Flow of Process in Inspection

The following description will discuss a flow of a process (determination method) in inspection with reference to FIG. 13. FIG. 13 is a view illustrating an example of an inspection method involving use of the information processing device 1. In the description below, it is assumed that the storage section 11 stores therein ultrasonic testing images 111 each of which is an image of echoes coming from a tube-to-tubesheet weld and its periphery and measured by circumferentially moving the probe.

In S21, the inspection image generating section 101 generates the inspection image 111A. Specifically, the inspection image generating section 102 obtains one of the ultrasonic testing images 111 stored in the storage section 11 and inputs the one of the ultrasonic testing images 111 into the extraction model, and extracts, from the one of the ultrasonic testing images 111, an area indicated by a resulting output value so as to generate an inspection image 111A.

In S22 (determining step), the determining sections 102 determine presence or absence of a defect with use of the inspection image 111A generated in S21. To be more specific, in the determining section 102A, the inspection image obtaining section 1021 obtains the inspection image 111A generated in S21, and the restored image generating section 1022 generates a restored image 111B from the inspection image 111A with use of the generative model constructed in S4 in S12. Then, the defect presence/absence determining section 1023 calculates pixel-by-pixel differences between the inspection image 111A and the restored image 111B, and calculates a variance of the differences. Then, the defect presence/absence determining section 1023 determines presence or absence of a defect in accordance with whether or not the value of the variance is higher than the threshold determined in S5 in FIG. 12. Note that, in a case where the removed image 111C and the removed image (restored) 111D have been generated, the defect presence/absence determining section 1023 calculates differences between these images.

The determining section 102B binarizes the inspection image 111A generated in S21 with use of the threshold determined in S9 in FIG. 12, so as to generate a binarized image. Then, the determining section 102B detects peripheral echo areas ar3 and ar4 in the binarized image thus generated, and determines presence or absence of a defect in accordance with whether or not an area sandwiched between these areas includes a defect area.

Then, the determining section 102C inputs the inspection image 111A generated in S21 into the decision model constructed in S11 in FIG. 12, and determines presence or absence of a defect in accordance with a resulting output value. For example, in a case of using the decision model that outputs the probability that a defect is present, the determining section 102C may determine that a defect is present if an output value from the decision model exceeds a given threshold. Such a threshold is also determined after the process in S11 in FIG. 12.

In S23 (reliability determining step), the reliability determining section 103 determines the reliability of the determination result given by the determining section 102, with use of the inspection image 111A generated in S21. Specifically, the reliability determining section 103 determines the reliability of the determination result given by the determining section 102A, in accordance with an output value obtained by inputting the inspection image 111A into the reliability prediction model constructed in S6 in FIG. 12.

For example, in a case where the reliability prediction model outputs a value which ranges from 0 to 1 and which indicates the probability that the determination result given by the determining section 102A is correct, the reliability determining section 103 may employ this value as the reliability as it is. Further, the reliability determining section 103 determines the reliability of the determination results of the determining sections 102B and 102C in a similar manner. In this manner, for each of the determining sections 102A to 102C, the reliability determining section 103 determines the reliability of the result of determination of presence or absence of a defect.

In S24 (comprehensive determination step), the comprehensive determination section 104 determines presence or absence of a defect with use of the determination results obtained in S22 and the reliabilities determined in S23. Specifically, the comprehensive determination section 104 determines presence or absence of a defect with use of numerical values obtained by summing up the values obtained by weighing, in accordance with their reliabilities, the numerical values indicating the determination results of the determining section 102A to 102C.

For example, each of the determination results of the determining sections 102A to 102C can be expressed by a numerical value "−1" (a defect is absent) or "1" (a defect is present). In this case, in a case where the reliabilities are obtained as numerical values ranging from 0 to 1, the determination results may be multiplied by the values of the reliabilities as they are.

Specifically, for example, assume that the determination result given by the determining section 102A indicates that a defect is present, the determination result given by the determining section 102B indicates that a defect is absent, and the determination result given by the determining section 102C indicates that a defect is present. Assume also that the reliabilities of the determination results of the determining sections 102A to 102C are 0.87, 0.51, and 0.95, respectively. In this case, the comprehensive determination section 104 carries out calculation in accordance with the following expression: 1×0.87+(−1)×0.51+1×0.95. Consequently, a numerical value of 1.31 is obtained.

Then, the comprehensive determination section 104 compares this numerical value with a given threshold. If the calculated numerical value is higher than the threshold, the comprehensive determination section 104 may determine that a defect is present. In a case where the result indicating that a defect is absent is expressed by a numerical value of "−1" and the result indicating that a defect is present is expressed by a numerical value of "1", the threshold may be set at "0", which is an intermediate value between these numerical values. In this case, since 1.31>0, a final determination result given by the comprehensive determination section 104 indicates that a defect is present.

In S25, the comprehensive determination section 104 records, in the inspection result data 112, the determination result obtained in S24. Then, in S26, a defect type determining process is carried out. Details of the defect type determining process will be described later with reference to FIGS. 14 and 15.

In S27, the inspection image generating section 101 determines whether or not all the ultrasonic testing images 111 that are targets to be inspected have already been processed. If it is determined that there is an unprocessed ultrasonic testing image 111 (NO in S27), the process returns to S21, where the inspection image generating section 101 reads out the unprocessed ultrasonic testing image 111 from the storage section 11 and generates an inspection image 111A from the ultrasonic testing image 111. Meanwhile, if it is determined that there is no unprocessed ultrasonic testing image 111 (YES in S27), the process advances to S28.

In S28, the integrative detection section 108 integrates the defects detected by the comprehensive determination section 104. Then, the integrative detection section 108 records the integration result in the inspection result data 112. A method for integrating the defects is as discussed with reference to FIG. 9, and therefore is not described here again. If there are no defects to be integrated, the processes in S28 and S29 will not be carried out, and the process advances to S30.

In S29, the defect length calculating section 109 calculates a length of the defects integrated by the integrative detection section 108. For example, the defect length calculating section 109 may calculate the length of the defect by multiplying (i) a length of a defect per ultrasonic testing image 111 by (ii) the number of defects integrated by the integrative detection section 108. Then, the defect length calculating section 109 records the calculation result in the inspection result data 112.

In S30, the thickness calculating section 107 calculates a wall thickness of the tube-to-tubesheet weld, and records the calculation result in the inspection result data 112. A method for calculating the wall thickness is as discussed above with reference to FIG. 10, and therefore is not described here again. When the calculation results of the wall thicknesses for all the inspection image 111A are recorded, the process shown in FIG. 13 is ended.

Flow of Defect Type Determining Process: Type Decision Model Used

The following description will discuss, with reference to FIG. 14, a flow of the defect type determining process carried out in S26 in FIG. 13. FIG. 14 is a flowchart illustrating an example of the defect type determining process. In S41, the heat map generating section 105 generates a heat map with use of difference values (difference image) calculated when the determining section 102A determines presence or absence of a defect. Then, in S42, the heat map generating section 105 carries out threshold processing on the heat map generated in S41. The threshold processing is as discussed above with reference to FIG. 5, and therefore is not described here again.

In S43, the defect type determining section 106 determines the type of the defect with use of the type decision model. Specifically, the defect type determining section 106 inputs, into the type decision model, the heat map having been subjected to the threshold processing in S42, and determines the type of the defect in accordance with a resulting output value. For example, in a case where the type decision model is constructed to output, for each type of defect, a numerical value indicating the likelihood that the defect corresponds to the type, the defect type determining section 106 may determine that the type of the defect is a type having a highest numerical value.

In S44, the defect type determining section 106 records, in the inspection result data 112, the determination result obtained in S43. Then, the defect type determining process is ended.

Flow of Defect Type Determining Process: In Accordance with Position of Defect Area The defect type determining section 106 may carry out, instead of the defect type determining process shown in FIG. 14, a defect type determining process shown in FIG. 15. FIG. 15 is a flowchart illustrating an example of a defect type determining process that determines the type of a defect in accordance with the position of a defect area.

In S51, the defect type determining section 106 carries out the threshold processing on the difference values (difference image) calculated when the determining section 102A determines presence or absence of a defect. The threshold processing in S51 is similar to the threshold processing in S42 in FIG. 14. In S52, the defect type determining section 106 detects a defect area in accordance with the difference values after the threshold processing. A method for detecting the defect area is as discussed with reference to FIG. 7, and therefore is not described here again.

In S53, the defect type determining section 106 determines the type of the defect in accordance with the position of the defect area identified in S52. For example, the defect type determining section 106 may determine the type of the defect in accordance with which of the areas AR1 to AR4 shown in FIG. 8 the defect area detected in S52 is contained.

In S54, the defect type determining section 106 records, in the inspection result data 112, the determination result obtained in S53. Then, the defect type determining process is ended.

Note that the defect type determining section 106 may carry out both the defect type determining process shown in FIG. 14 and the defect type determining process shown in FIG. 15. In this case, the defect type determining section 106 may record the determination results obtained in both. The defect type determining section 106 may integrate the two determination results together to make final determination of the type of the defect. In this case, the defect type determining section 106 may calculate the reliability of the determination result given by the defect type determining process shown in FIG. 14 and the reliability of the determination result given by the defect type determining process shown in FIG. 15, and may yield a final determination result regarding the type of the defect in accordance with the reliabilities thus calculated. In this case, the reliabilities can be calculated in a similar manner to that for the reliability of the determination result given by the determining section 102.

Application Examples

The foregoing embodiment has dealt with the example in which presence or absence of a defect in a tube-to-tubesheet weld is determined in accordance with an ultrasonic testing image 111. However, the determination matter may be any matter, and the target data to be used for the determination may be any data selected in accordance with the determination matter. The determination matter and the target data are not limited to those adopted in the foregoing embodiment.

For example, the information processing device 1 is applicable to an inspection for determining presence or absence of a defect (which may also called "abnormal portion") in an inspection target in radiographic testing (RT). In this case, an image related to an abnormal portion is detected from, in place of a radiograph, image data obtained with use of an electric device such as an imaging plate.

Also in this case, the determining section 102A can determine presence or absence of a defect with use of a generative model, and the determining section 102C can determine presence or absence of an abnormal portion with use of a decision model. Also, the determining section 102B can determine presence or absence of an abnormal portion by numerical analysis in accordance with pixel values, size, and/or the like of the image captured in the image data.

In ultrasonic testing or RT, it is possible to determine presence or absence of an abnormal portion with use of signal waveform data of an echo of an ultrasonic wave or a radioactive ray, in place of image data. Thus, the information processing device 1 is applicable to various kinds of nondestructive inspections that uses various data. Furthermore, the information processing device 1 is applicable to, in addition to the nondestructive inspections, detection of an object in a still image or a moving image and classification of the detected object, for example.

Variations

The foregoing embodiment has dealt with the example in which an output value obtained by inputting an inspection image into a reliability prediction model is used as a reliability. However, the present invention is not limited to this example. The reliability may be any one, provided that it is derived from data used by the determining section 102 for determination.

For example, in a case where the determining section 102B determines presence or absence of a defect with use of a binarized image obtained by binarizing an inspection image, the reliability prediction model for the determining section 102B may be a model that accepts a binarized image as input data. Meanwhile, in this case, if the determining section 102C determines presence or absence of a defect with use of the inspection image as it is, the reliability prediction model for the determining section 102C may be a model that accepts an inspection image as input data. Thus, the reliability prediction models for the determining sections 102 do not need to be constructed to accept completely the same input data.

The foregoing embodiment has dealt with the example in which the three determining sections 102 are employed. Alternatively, the number of determining sections 102 may be two or four or more. In the foregoing embodiment, the determination methods of the three determining sections 102 differ from each other. Alternatively, the determination methods of the three determining sections 102 may be the same. Determining sections 102 configured to carry out the same determination method may be configured to use different thresholds for determination and/or different training data to construct learnt models for determination.

An entity that carries out each process described in each of the foregoing embodiments can be changed as appropriate. For example, the processes in S21 (generation of an inspection image), S23 (calculation with use of a reliability decision model), S26 (determination of the type of a defect), S28 (integration of defects), S29 (calculation of a defect length), and S30 (calculation of a wall thickness) in the flowchart shown in FIG. 13 may be carried out by another information processing device. Similarly, a part or all of the processes to be executed by the determining sections 102A to 102C may be executed by another information processing device. In these cases, the number of another information processing device(s) may be one or two or more. As discussed above, the functions of the information processing device 1 can be realized by wide variety of system configurations. In a case where a system including a plurality of information processing devices is constructed, some of the plurality of information processing devices may be provided on cloud. That is, the functions of the information processing device 1 can also be realized by one information processing device or a plurality of information processing devices carrying out information processing online.

Software Implementation Example

Control blocks of the information processing device 1 (particularly, the sections included in the control section 10) can be realized by a logic circuit (hardware) provided in an integrated circuit (IC chip) or the like or can be alternatively realized by software.

In the latter case, the information processing device 1 includes a computer that executes instructions of an information processing program that is software realizing the foregoing functions. The computer, for example, includes at least one processor and a computer-readable storage medium storing the information processing program. An object of the present invention can be achieved by the processor of the computer reading and executing the information processing program stored in the storage medium. Examples of the processor encompass a central processing unit (CPU). The information processing device 1 may include, in addition to the processor such as CPU, a graphics processing unit (GPU). Use of GPU enables, e.g., high-speed computing involving use of the foregoing various models. The storage medium can be a "non-transitory tangible medium" such as a tape, a disk, a card, a semiconductor memory, a programmable logic circuit as well as a read only memory (ROM) or the like. The computer can further include a random access memory (RAM) in which the program is loaded. Further, the program may be made available to the computer via any transmission medium (such as a communication network and a broadcast wave) which enables transmission of the program. Note that an aspect of the present invention can also be implemented by the program in the form of a computer data signal embedded in a carrier wave which is embodied by electronic transmission.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: information processing device
102A: determining section (generative model determining section)
102B: determining section (numerical analysis/determination section)
102C: determining section
103: reliability determining section
104: comprehensive determination section

The invention claimed is:

1. An information processing device comprising a processor which carries out:
   a reliability determining step of determining, using single target data, reliabilities which are indices indicating degrees of certainties of determination results obtained, from the single target data, by determining a given determination matter by a plurality of determination methods that are different from each other; and
   a comprehensive determination step of determining the given determination matter with use of the determination results and the reliabilities determined in the reliability determining step,
   wherein, in the reliability determining step, the processor determines the plurality of reliabilities, in accordance with output values obtained by inputting the target data into a plurality of reliability prediction models respectively corresponding to the plurality of determination methods; and
   wherein each of the plurality of reliability prediction models is constructed by machine learning that uses training data in which (i) data used for determination of the given determination matter by one of the plurality of determination methods for corresponding one of the plurality of reliability prediction models is associated with, as correct data, (ii) information indicating whether or not a result of the determination is correct.

2. The information processing device as set forth in claim 1, wherein the target data is an image of an inspection target; wherein the given determination matter is presence or absence of an abnormal portion in the inspection target; wherein each of the plurality of determination methods includes a determination method for determining presence or absence of the abnormal portion with use of a generated image generated by inputting the image that is the target data into a generative model; and wherein the generative model is constructed by machine learning that uses, as training data, an image of an inspection target not having the abnormal portion, the generative model being constructed to generate a new image having a similar feature to an image input into the generative model.

3. The information processing device as set forth in claim 2, wherein the plurality of determination methods includes a determination method for analyzing pixel values in the target data, which is the image of the inspection target, so as to identify an inspection target portion in the target data and for determining presence or absence of the abnormal portion in accordance with pixel values in the inspection target portion thus identified.

4. The information processing device as set forth in claim 3, wherein the target data is an ultrasonic testing image which is an image of an echo of an ultrasonic wave propagated in the inspection target;

wherein in the determination method for determining presence or absence of the abnormal portion in accordance with the pixel values in the inspection target portion, the processor identifies, as the inspection target portion, an area sandwiched between two peripheral echo areas in each of which an echo coming from a periphery of the inspection target portion appears repeatedly, and determines presence or absence of the abnormal portion in accordance with whether or not the inspection target portion thus identified includes an area constituted by pixel values each being not less than a threshold; and wherein the processor further carries out a thickness calculating step of calculating a thickness of the inspection target portion in accordance with a distance between the two peripheral echo areas.

5. A determination method being executed by one or more information processing devices, comprising:

a reliability determining step of determining, using single target data, reliabilities which are indices indicating degrees of certainties of determination results obtained, from the single target data, by determining a given determination matter by a plurality of determination methods that are different from each other; and a comprehensive determining step of determining the given determination matter with use of the determination results and the reliabilities determined in the reliability determining step, wherein, in the reliability determining step, the one or more information processing devices determine the plurality of reliabilities, in accordance with output values obtained by inputting the target data into a plurality of reliability prediction models respectively corresponding to the plurality of determination methods; and wherein each of the plurality of reliability prediction models is constructed by machine learning that uses training data in which (i) data used for determination of the given determination matter by one of the plurality of determination methods for corresponding one of the plurality of reliability prediction models is associated with, as correct data, (ii) information indicating whether or not a result of the determination is correct.

6. A non-transitory computer readable medium storing an information processing program configured to cause a computer to function as an information processing device recited in claim 1, the information processing program causing the computer to carry out the reliability determining step and the comprehensive determination step.

* * * * *